(12) United States Patent
Yeap et al.

(10) Patent No.: US 8,908,520 B2
(45) Date of Patent: Dec. 9, 2014

(54) METHOD AND SYSTEM FOR SERVICE-BASED REGULATION OF TRAFFIC FLOW TO CUSTOMER PREMISES DEVICES

(75) Inventors: Tet Hin Yeap, Ontario (CA); Azrin Aris, Selangor (MY); Siti Sawiah Ramli, Kuala Lumpur (MY); Ching King Chia, Selangor (MY); Nurul Shuhada Ahsan Miskam, Selangor (MY); Rohayu Yusof, Selangor (MY)

(73) Assignee: Telekom Malaysia Berhad, Kuala Lumpur (MY)

( * ) Notice: Subject to any disclaimer, the term of this patent is extended or adjusted under 35 U.S.C. 154(b) by 57 days.

(21) Appl. No.: 13/378,434

(22) PCT Filed: Jun. 26, 2009

(86) PCT No.: PCT/MY2009/000079
§ 371 (c)(1),
(2), (4) Date: Dec. 15, 2011

(87) PCT Pub. No.: WO2010/151099
PCT Pub. Date: Dec. 29, 2010

(65) Prior Publication Data
US 2012/0093505 A1    Apr. 19, 2012

(51) Int. Cl.
*H04J 1/16* (2006.01)
*H04L 12/801* (2013.01)
*H04L 12/28* (2006.01)
*H04M 11/06* (2006.01)

(52) U.S. Cl.
CPC ............ *H04L 47/10* (2013.01); *H04L 12/2889* (2013.01); *H04M 11/062* (2013.01)
USPC ............................ 370/235; 370/230; 370/392

(58) Field of Classification Search
USPC .................................. 370/229–252, 389–392
See application file for complete search history.

(56) References Cited

U.S. PATENT DOCUMENTS

| 7,376,386 | B2 * | 5/2008 | Phillips et al. ............... 455/3.01 |
| 2002/0141345 | A1 * | 10/2002 | Szviatovszki et al. ........ 370/238 |
| 2002/0196488 | A1 * | 12/2002 | Myers ........................... 359/109 |
| 2004/0136373 | A1 | 7/2004 | Bareis |
| 2006/0067213 | A1 * | 3/2006 | Evans et al. .................... 370/229 |
| 2006/0140221 | A1 * | 6/2006 | Yamada et al. ............... 370/503 |
| 2007/0036174 | A1 * | 2/2007 | Aris et al. ..................... 370/466 |

(Continued)

FOREIGN PATENT DOCUMENTS

| EP | 0961522 | 12/1999 | |
| EP | 1885139 A1 * | 2/2008 | ............... H04Q 3/60 |

*Primary Examiner* — Kan Yuen
(74) *Attorney, Agent, or Firm* — Jacobson Holman Hershkovitz, PLLC.

(57) ABSTRACT

A method of regulating traffic flow to customer premises devices (CPDs) reachable via outside plant units (OPUs). The method comprises receiving first packets in a first traffic category via a first interface, the first packets being destined for respective CPDs; receiving second packets in a second traffic category via a second interface, the second packets being destined for respective CPDs; determining a destination OPU for each of the first and second packets. For each particular OPU that is the destination OPU for one or more packets, the packets are buffered and transmitted via an OPU interface for the particular OPU. The destination OPU for a particular packet is determined by identifying the OPU via which the CPD for which the particular packet is destined is reachable. Packet flow via the OPU interface is regulated by prioritizing transmission of first packets over transmission of second packets.

136 Claims, 7 Drawing Sheets

(56) References Cited

U.S. PATENT DOCUMENTS

| | | | |
|---|---|---|---|
| 2008/0095053 A1* | 4/2008 | Chen et al. | 370/230.1 |
| 2009/0028157 A1* | 1/2009 | Leyrer et al. | 370/395.1 |
| 2009/0168790 A1* | 7/2009 | Lee | 370/412 |
| 2010/0021161 A1* | 1/2010 | Endo et al. | 398/45 |
| 2010/0241814 A1* | 9/2010 | Cypher et al. | 711/144 |

* cited by examiner

METHOD AND SYSTEM FOR SERVICE-BASED REGULATION OF TRAFFIC FLOW TO CUSTOMER PREMISES DEVICES

This is a national stage of PCT/MY09/000,079 filed Jun. 26, 2009 and published in English, hereby incorporated by reference.

FIELD OF THE INVENTION

The present invention relates generally to the delivery of telecommunications services such as voice, video and data to customer premises devices, and more specifically to a method and system for service-based regulation of traffic flow to the customer premises devices.

BACKGROUND

Telecommunication companies all over the world are continuously striving to enhance their infrastructure in order to provide better broadband services and therefore meet the expectations of their customers.

A popular implementation for delivering broadband services is the xDSL-based infrastructure, as it uses existing copper wires. This ensures that the copper investment is not wasted while at the same time keeps deployment costs relatively low. However, as the xDSL-based infrastructure becomes more complicated (e.g., due to the requirement to deliver broadband services at a higher bandwidth), its use ceases to be cost-effective. In particular, switching components in the remote (outside plant) unit are required to operate at higher speeds, leading to increased cost.

The architectural design of the remote unit also suffers from another major issue, namely heat. In particular, excessive heat is generated by components of the remote unit operating at high frequencies, such as switching components, optical devices and so on. The heat generated by these devices will increase the ambient temperature within the remote unit. In the summer or in countries with a tropical climate, the remote unit might fail to function properly as the ambient temperature of the remote unit meets and/or exceeds its maximum rated operating temperature.

Another major issue plaguing the existing design of an xDSL-based infrastructure is quality of service (QoS), particularly as the number of users increases (e.g., as a result of an increase in population density). The current paradigm calls for implementing QoS at the network core. However, traffic congestion is almost negligible at this point because of the presence of high capacity-links in the network core. Instead, it can be observed that traffic congestion actually occurs closer to the periphery of the network, namely at the links branching out to the various remote units that service individual neighborhoods. These links have a fixed bandwidth and cannot readily cope with traditional QoS management mechanisms that rely on external factors to prioritize traffic, such as service level agreements (SLAs) reached with individual customers or end user applications that autonomously (and often greedily) assign a priority level to their own packets.

As a result, when packets associated with multiple services being delivered to one or more customers over a shared physical link compete for bandwidth resources on that link, a reduction in service performance or QoS is likely to occur in an unpredictable fashion, leading to a degraded customer experience.

Therefore, there is a need in the industry to address certain shortcomings of the conventional approach to delivering broadband services over an xDSL-based infrastructure.

SUMMARY OF THE INVENTION

According to a first broad aspect, the present invention seeks to provide a method of regulating traffic flow to a plurality of customer premises devices (CPDs), each of the CPDs being reachable via a corresponding one of a plurality of outside plant units (OPUs). The method comprises receiving traffic in a first category via a first interface, the traffic in the first category comprising first packets, each of said first packets being destined for a respective CPD that is among said plurality of CPDs; receiving traffic in a second category via a second interface distinguishable from the first interface, the traffic in the second category comprising second packets, each of said second packets being destined for a respective CPD that is among said plurality of CPDs; determining a destination OPU for each of the first and second packets and, for each particular OPU that is the destination OPU for one or more packets, buffering the one or more packets and transmitting the buffered packets via an OPU interface uniquely associated with the particular OPU, the destination OPU for a particular packet being determined by identifying the OPU via which the CPD for which the particular packet is destined is reachable; and regulating packet flow via the OPU interface by prioritizing transmission of those of the buffered packets that are first packets over transmission of those of the buffered packets that are second packets.

According to a second broad aspect, the present invention seeks to provide a method of routing traffic originating from a plurality of customer premises devices (CPDs), wherein traffic originating from each of the CPDs arrives via a corresponding one of a plurality of outside plant units (OPUs). The method comprises receiving traffic from the OPUs via respective input interfaces, the traffic comprising packets each of which originates from a respective one of said CPDs; determining a traffic category of each of said packets; releasing via a first output interface those packets determined to be in a first traffic category; and releasing via a second output interface distinguishable from the first output interface those packets determined to be in a second traffic category.

According to a third broad aspect, the present invention seeks to provide an apparatus for use in regulating traffic flow to a plurality of customer premises devices (CPDs), each of the CPDs being reachable via a corresponding one of a plurality of outside plant units (OPUs). The apparatus comprises a first interface over which is received traffic in a first category, the traffic in the first category comprising first packets, each of said first packets being destined for a respective one of said CPDs; a second interface distinguishable from the first interface and over which is received traffic in a second category, the traffic in the second category comprising second packets, each of said second packets being destined for a respective one of said CPDs; a plurality of OPU interfaces, the OPU interfaces being uniquely associated with respective ones of said OPUs and connectable thereto; a plurality of output buffers, each of the output buffers being configured to temporarily store packets for release towards a respective one of said OPUs via the uniquely associated one of said OPU interfaces; a distribution/routing engine configured to determine a destination OPU for each of the first and second packets and to send each of the first and second packets towards the output buffer associated with the destination OPU for that packet, the destination OPU for a particular packet being determined by identifying the OPU via which the CPD for which the particular packet is destined is reachable; and at least one output buffer control entity configured to regulate packet flow via the OPU interfaces by prioritizing release from at least one of said output buffers of buffered packets that are first packets over release of buffered packets that are second packets.

According to a fourth broad aspect, the present invention seeks to provide an apparatus for use in regulating traffic flow to a plurality of customer premises devices (CPDs), each of the CPDs being reachable via a corresponding one of a plurality of outside plant units (OPUs). The apparatus comprises means for receiving traffic in a first category via a first interface, the traffic in the first category comprising first packets, each of said first packets being destined for a respective CPD that is among said plurality of CPDs; means for receiving traffic in a second category via a second interface distinguishable from the first interface, the traffic in the second category comprising second packets, each of said second packets being destined for a respective CPD that is among said plurality of CPDs; means for determining a destination OPU for each of the first and second packets and, for each particular OPU that is the destination OPU for one or more packets, buffering the one or more packets and transmitting the buffered packets via an OPU interface uniquely associated with the particular OPU, the destination OPU for a particular packet being determined by identifying the OPU via which the CPD for which the particular packet is destined is reachable; and means for regulating packet flow via the OPU interface by prioritizing transmission of those of the buffered packets that are first packets over transmission of those of the buffered packets that are second packets.

According to a fifth broad aspect, the present invention seeks to provide an apparatus for use in routing traffic originating from a plurality of customer premises devices (CPDs), wherein traffic originating from each of the CPDs arrives via a corresponding one of a plurality of outside plant units (OPUs). The apparatus comprises a plurality of input interfaces over which is received traffic from respective ones of the OPUs, the traffic comprising packets each of which originates from a respective one of said CPDs; a first output interface and a second output interface distinguishable from the first output interface; a distribution/routing engine configured to determine a traffic category of each of said packets, to release via the first output interface those packets determined to be in a first traffic category and to release via the second output interface those packets determined to be in a second traffic category different from the first traffic category.

According to a sixth broad aspect, the present invention seeks to provide an apparatus for use in routing traffic originating from a plurality of customer premises devices (CPDs), wherein traffic originating from each of the CPDs arrives via a corresponding one of a plurality of outside plant units (OPUs). The apparatus comprises means for receiving traffic from the OPUs via respective input interfaces, the traffic comprising packets each of which originates from a respective one of said CPDs; means for determining a traffic category of each of said packets; means for releasing via a first output interface those packets determined to be in a first traffic category; and means for releasing via a second output interface distinguishable from the first output interface those packets determined to be in a second traffic category.

DETAILED DESCRIPTION

Figure 1:
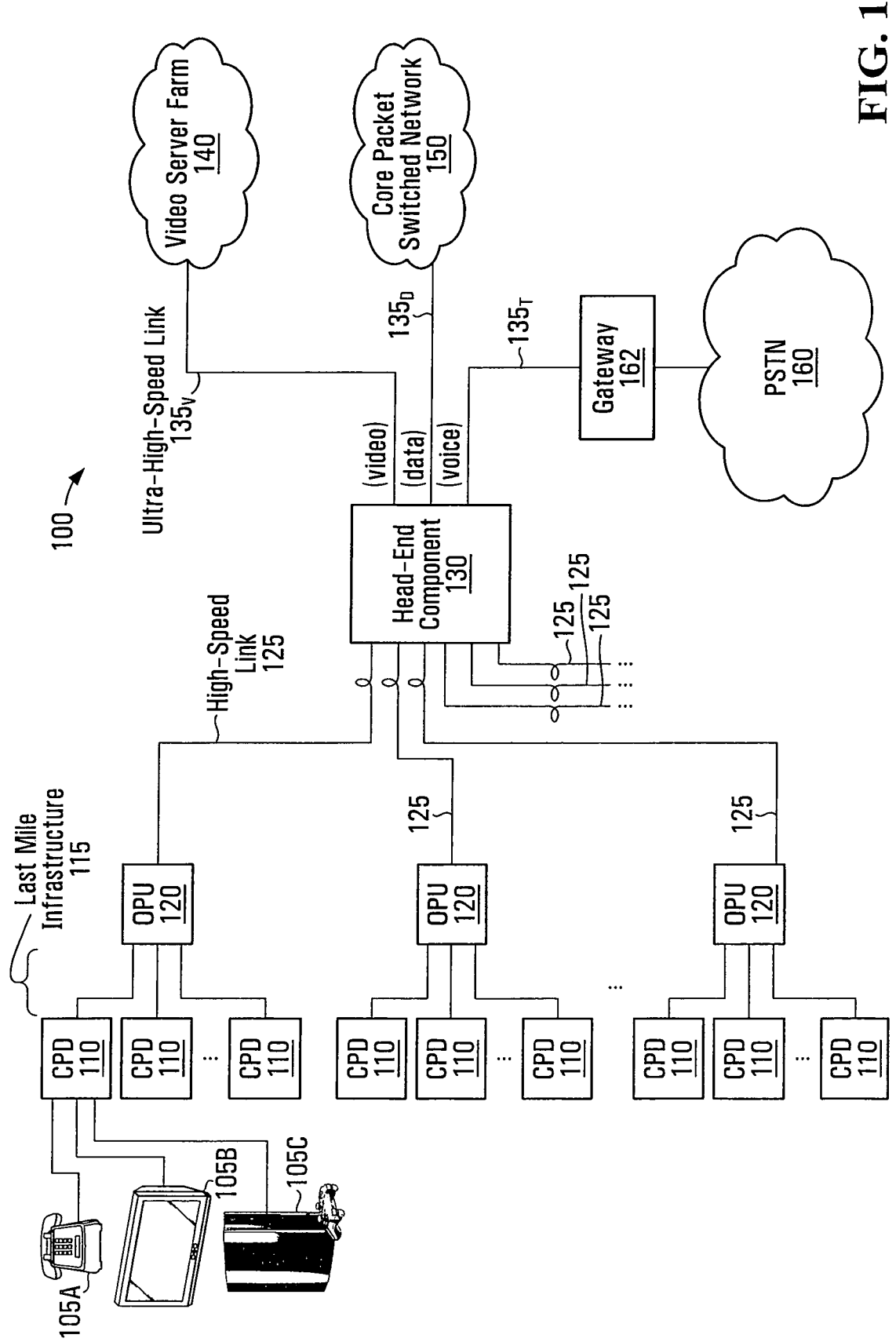
FIG. 1 is a block diagram showing components of a system for service-based regulation of traffic flow to customer premises devices according to a non-limiting example of implementation the invention, the system including a head-end component and a plurality of Outside Plant Units (OPUs)

In accordance with a non-limiting embodiment of the present invention, and with reference to FIG. 1, a system 100 for the service-based regulation of traffic flow to customer premises devices (CPDs) is presented. The system 100 includes a plurality of CPDs 110 that are distributed throughout a particular geographic region, such as an urban, suburban or rural area. Examples of geographic regions throughout which the CPDs 110 may be distributed include residential areas (e.g., apartment buildings, housing developments), commercial areas (e.g., individual retail stores, shopping malls, office buildings) and industrial areas (e.g., factories, warehouses, industrial parks).

The system 100 also includes a plurality of Outside Plant Units (OPUs) 120. Each of the OPUs 120 is connected to a subset of the CPDs 110 in a particular geographic area. This connection is achieved over a so-called "last-mile" infrastructure 115, which belongs to or is managed by a network access provider. The last-mile infrastructure 115 that connects each of the CPDs 110 to a respective one of the OPUs 120 may include a wired component (such as copper twisted-pair cable or a power line) and/or a wireless component, such as a proximate cellular base station or a wireless WAN (e.g., WiMAX) installation.

The CPDs 110 each comprise certain communications equipment for communicating with respective ones of the OPUs 120. The implementation of the CPDs 110 and, in particular, their communications equipment, depends on the last-mile infrastructure 115. For example, where the last-mile infrastructure 115 is based on copper twisted-pair cable, the CPDs 110 may each comprise a broadband modem that is designed to communicate over such an infrastructure. Other possibilities exist and are within the scope of the present invention.

A particular one of the CPDs 110 may comprise a distribution/aggregation device (not shown), allowing multiple end user devices $105_A$, $105_B$, $105_C$ to share the use of the connection between the particular one of the CPDs 110 and the respective one of the OPUs 120. Non-limiting examples of a distribution/aggregation device include a router, splitter and/or residential gateway, whereas non-limiting examples of an end user device include television set top boxes, computers, gaming devices and/or telephones.

The system 100 also comprises a head-end component 130 (or "head-end unit"). The head-end component 130 may be connected via one or more ultra high-speed links $135_V$, $135_D$, $135_T$ to certain resources that are provided by, or made accessible to, the network access provider. Such resources may include a video server farm 140, a core packet-switched network 150 (such as the Internet), and/or a Public Switched Telephone Network (PSTN) 160 (accessible via a PSTN gateway 162).

The OPUs 120 are connected to the head-end component 130 via respective high-speed links 125. Individual ones of the high-speed links 125 may be bi-directional or formed from pairs of unidirectional links. For example, an optical fiber link can be used for downstream traffic travelling from the head-end component 130 to a given one of the OPUs 120, as well as for upstream traffic travelling in the other direction (i.e., from the given one of the OPUs 120 to the head-end component 130). Where the high-speed links 125 are formed from pairs of unidirectional links, the same or different linking media may be used for each unidirectional link. For example, a linking medium that is wired (e.g., an optical fiber link) can be used for downstream traffic travelling from the head-end component 130 to a given one of the OPUs 120, whereas a linking medium that is wireless (e.g., a WiMAX connection or a satellite link) can be used in the opposite direction (i.e., from the given one of the OPUs 120 to the head-end component 130). It should be appreciated that communications along the high-speed links 125 may be carried out in accordance with any suitable communications protocol. Examples of such protocols that will be well known to those skilled in the art include the SONET and SDH multiplexing protocols, as well as the 10, 100 and 1000 Gigabit Ethernet (GbE) protocols, among others.

In some non-limiting embodiments, it is expected that the high-speed links 125 will be bandwidth-constrained. Constraints on bandwidth can be inherent due to the linking media and signaling protocol used, or they may be artificially imposed by the network access provider. In particular, bandwidth constraints may be artificially imposed on the high-speed links 125 in order to limit the processing power required by the OPUs 120 to levels that keep the heat generated from their casings during operation to within acceptable bounds. In this way, the OPUs 120 can be designed in a cost-effective way and/or such that the unsightly addition of cooling equipment otherwise needed to dissipate excess heat generated during operation can be avoided.

Head-End Component

Figure 2:
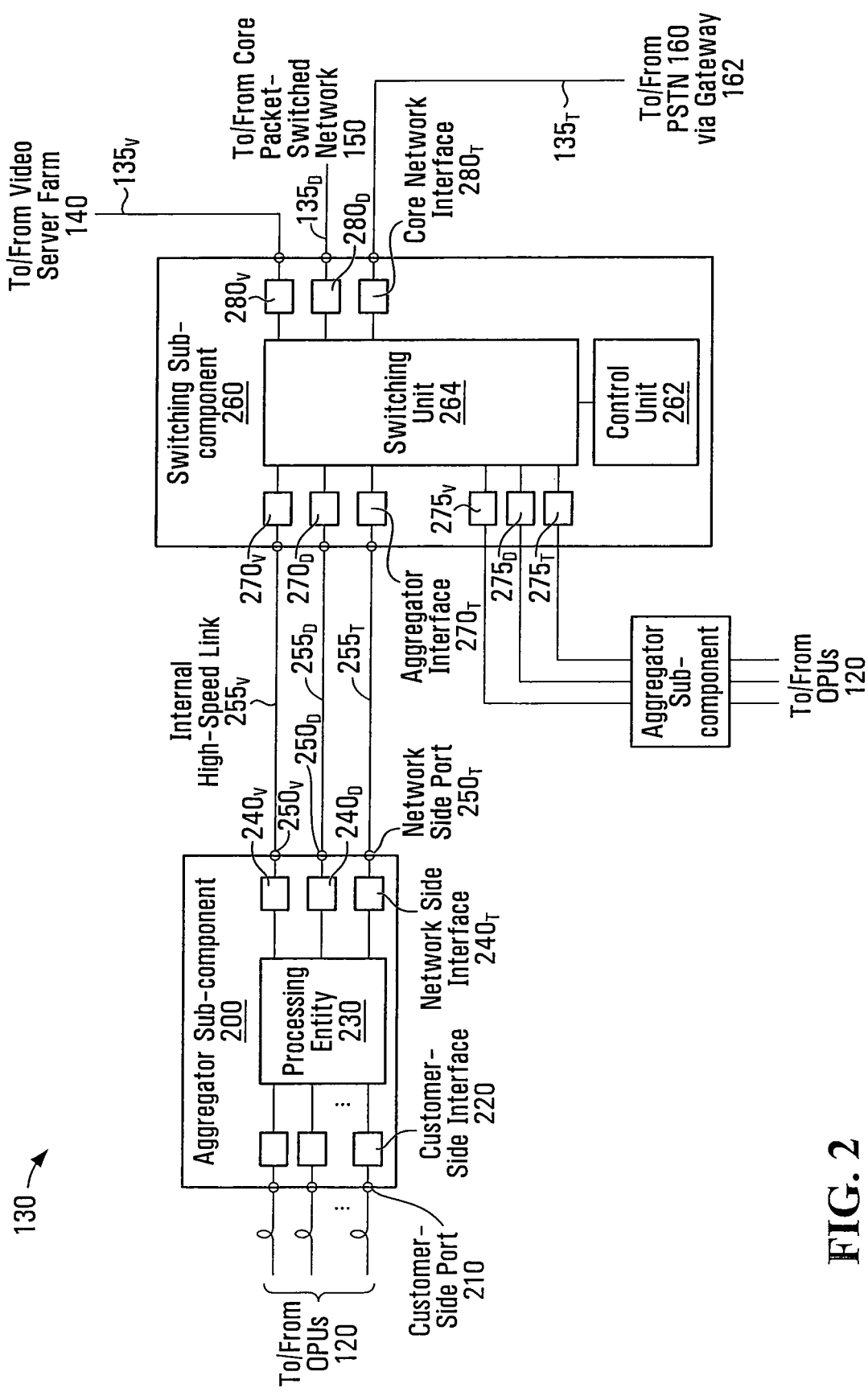
FIG. 2 is a block diagram showing components of the head-end component included within the system illustrated in FIG. 1.

FIG. 2 shows a possible configuration of the head-end component 130, in an example non-limiting embodiment. In particular, FIG. 2 shows that the head-end component 130 includes various sub-components including an aggregator sub-component 200 and a switching sub-component 260, as well as a set of internal high-speed links $255_V$, $255_D$, $255_T$ that facilitate communications between these two sub-components. The switching sub-component 260 can be connected to any number of instances of an aggregator sub-component. In fact, FIG. 2 shows two (2) instances of an aggregator sub-component as being connected to the switching sub-component 260. However, to simplify the description, unless otherwise noted, the remainder of the description will consider only the aggregator sub-component 200.

The aggregator sub-component 200 may represent the portion of the head-end component 130 that can be connected to the OPUs 120 via the high-speed links 125. The aggregator sub-component 200 can be thought of as having a "customer side" that is connected to the OPUs 120, as well as a "network side", which is connected to the switching sub-component 260. The aggregator sub-component 200 includes a set of customer-side ports 210, a set of customer-side interfaces 220 (or "OPU interfaces"), a processing entity 230, a set of network-side interfaces $240_V$, $240_D$, $240_T$ and a set of network-side ports $250_V$, $250_D$, $250_T$.

The "customer side" of the aggregator sub-component 200 typically includes the aforementioned customer-side ports 210 and customer-side interfaces 220. The customer-side ports 210 terminate respective ones of the high-speed links 125 that connect the head-end component 130 to its subtending OPUs 120. In the illustrated embodiment, the aggregator sub-component 200 includes three (3) customer-side ports 210, although this number should not be considered as a limitation of the invention.

Each of the customer-side ports 210 corresponds to a respective one of the customer-side interfaces 220 that converts signals received along the high-speed links 125 into signals compatible with the remainder of the head-end component 130 using methods that are known in the art. For example, in the case where the high-speed links 125 are based on optical fiber, the customer-side interfaces 220 may comprise optical-to-electrical conversion circuitry for converting optical signals originating from respective ones of the OPUs 120 to electrical signals that can be processed by the processing entity 230 of the aggregator sub-component 200.

The "network side" of the aggregator sub-component 200 includes the aforementioned network-side interfaces $240_V$, $240_D$, $240_T$ and network-side ports $250_V$, $250_D$, $250_T$. The network-side ports $250_V$, $250_D$, $250_T$ terminate the internal high-speed links $255_V$, $255_D$, $255_T$ between the aggregator sub-component 200 and the switching sub-component 260. Specifically, each of the network-side ports $250_V$, $250_D$, $250_T$ corresponds to a respective one of the network-side interfaces $240_V$, $240_D$, $240_T$ that processes, converts and/or encodes signals or data to be sent by the aggregator sub-component 200 into a form compatible with the internal high-speed links $255_V$, $255_D$, $255_T$ and the switching sub-component 260 using methods known in the art.

Each of the network-side interfaces $240_V$, $240_D$, $240_T$ is designed to handle a particular "category" (or "type") of traffic. A common category of traffic includes traffic which, while different in terms of actual content, has sufficient commonality such that it requires a common degree of treatment with respect to one or more parameters such as bandwidth, priority, loss, delay, etc. An examples of a traffic category is video traffic, which may have certain high-bandwidth, low-loss requirements. Another category is voice, which has less stringent bandwidth and loss requirements but requires low delay. Another category is data which can have relaxed bandwidth and delay requirements but might tolerate very little loss. These requirements and general characterizations are merely examples and are not to be taken as limiting.

In accordance with a specific non-limiting embodiment of the present invention, at least two (2) of the network-side interfaces $240_V$, $240_D$, $240_T$ are distinguishable from one another and are dedicated to handling different categories of traffic. For example, network-side interface $240_V$ may be used to handle traffic in the video category, network-side interface $240_D$ may be used to handle traffic in the data category and network-side interface $240_T$ may be used to handle data in the voice category.

In the illustrated embodiment, the three (3) network-side interfaces $240_V$, $240_D$, $240_T$ are respectively connected to the three (3) network-side ports $250_V$, $250_D$, $250_T$. As with the network-side interfaces $240_V$, $240_D$, $240_T$, the network-side ports $250_V$, $250_D$, $250_T$ are similarly allocated to distinct categories of traffic traveling between the aggregator sub-component 200 and the switching sub-component 260. Specifically, network-side port $250_V$ carries video traffic, network-side port $250_D$ carries data traffic and network-side port $250_T$ carries voice traffic. In other embodiments, however, traffic in different categories may be multiplexed onto a single internal high-speed link (via a single network-side port), in which case the network-side interfaces $240_V$, $240_D$, $240_T$ in the aggregator sub-component 200 may connect to multiplexing/demultiplexing circuitry that allows co-existence of multiple traffic types on a single physical link.

The processing entity 230 conceptually straddles the customer-side and network-side portions of the aggregator sub-component 200. The processing entity 230 can be implemented in hardware, software or a combination of hardware and software that executes code which implements a control logic function. The processing entity 230 performs several functions that will be discussed later on.

The switching sub-component 260 forms the other main component within the head-end component 130. The switching sub-component 260 is comprised of a control unit 262, a switching unit 264, a set of aggregator interfaces $270_V$, $270_D$, $270_T$, $275_V$, $275_D$, $275_T$ and a set of core network interfaces $280_V$, $280_D$, $280_T$.

As with the aggregator sub-component 200, the switching sub-component 260 can be thought of as having a "customer side" and a "network side". On the "customer-side", the switching sub-component 260 connects to the aggregator sub-component 200 (rather than directly to the OPUs 120) over the internal high-speed links $255_V$, $255_D$, $255_T$. It should be noted that unlike the bandwidth-constrained high-speed links 125 that connect the OPUs 120 to the aggregator sub-component 200, the internal high-speed links $255_V$, $255_D$, $255_T$ between the switching sub-component 260 and the aggregator sub-component 200 can be assumed to always have sufficient bandwidth, as they are under the full control of the network access provider.

The "customer side" of the switching sub-component 260 includes the aforementioned aggregator interfaces $270_V$, $270_D$, $270_T$, $275_V$, $275_D$, $275_T$. In the case of aggregator interfaces $270_V$, $270_D$, $270_T$, these terminate the internal high-speed links $255_V$, $255_D$, $255_T$ connecting the switching sub-component 260 to the aggregator sub-component 200. Each of the aggregator interfaces $270_V$, $270_D$, $270_T$ is connected to a respective one of the network-side ports $250_V$, $250_D$, $250_T$ of the aggregator sub-component 200. Each of the aggregator interfaces $270_V$, $270_D$, $270_T$ is designed to handle a distinct category of traffic between the switching sub-component 260 and the aggregator sub-component 200. Specifically, aggregator interface $270_V$ handles video traffic, aggregator interface $270_D$ handles data traffic and aggregator interface $270_T$ handles voice traffic. In other embodiments, traffic in different categories may be multiplexed onto a single internal high-speed link, in which case the aggregator interfaces $270_V$, $270_D$, $270_T$ in the aggregator sub-component 200 may connect to multiplexing/demultiplexing circuitry that allows co-existence of multiple traffic types on a single physical link.

The "network side" of the switching sub-component 260 includes the aforementioned core network interfaces $280_V$, $280_D$, $280_T$. The core network interfaces $280_V$, $280_D$, $280_T$ allow traffic to be processed and transferred via the ultra high-speed links $135_V$, $135_D$, $135_T$ between the head-end component 130 and other components of the system 100, such as the video server farm 140, the core packet-switched network 150 and/or the PSTN 160.

In the illustrated embodiment, the switching sub-component 260 includes three (3) core network interfaces $280_V$, $280_D$, $280_T$. In the illustrated embodiment, the core network interfaces $280_V$, $280_D$, $280_T$ are designed to handle distinct categories of traffic traveling between the switching sub-component 260 and the core packet-switched network 150, the video server farm 140 and/or the PSTN 160 via distinct physical ports. In other embodiments, traffic in different categories may be multiplexed onto a single ultra high-speed link, in which case the core network interfaces $280_V$, $280_D$, $280_T$ may connect to multiplexing/demultiplexing circuitry that allows co-existence of multiple traffic types on a single physical link.

The implementation of individual ones of the core network interfaces $280_V$, $280_D$, $280_T$ depends on the type of ultra high-speed links $135_V$, $135_D$, $135_T$ used to connect the switching sub-component 260 to the other components of the system 100. For example, a particular one of the core network interfaces $280_V$, $280_D$, $280_T$ may provide electrical-to-optical conversion (and vice versa) and SONET frame assembly/disassembly if the ultra-high speed connection to the core packet-switched network 150, the video server farm 140 and/or the PSTN 160 is composed of a SONET link. Another one of the core network interfaces $280_V$, $280_D$, $280_T$ may provide 10GBE encapsulation/de-encapsulation if the ultra-high speed connection to the core packet-switched network 150, the video server farm 140 and/or the PSTN 160 is composed of a 10GBE link.

As stated earlier, the switching sub-component 260 includes a control unit 262 and a switching unit 264. The switching unit 264 carries out switching of packets received from the internal high-speed links $255_V$, $255_D$, $255_T$ (in an upstream direction) and from the ultra high-speed links $135_V$, $135_D$, $135_T$ (in a downstream direction). In this way, packets destined to or from the OPUs 120 (via the aggregator sub-component 200) and/or destined to or from the video server farm 140, the core packet-switched network 150 and/or the PSTN 160 can be switched appropriately.

The control unit 262 controls the functionality of the switching unit 264. The control unit 262 can be implemented as dedicated hardware, software or a combination of dedicated hardware and software that executes code which implements a control logic function.

In one non-limiting embodiment of the invention, the switching unit 264 is used to route traffic arriving from the video server farm 140, the core packet-switched network 150 and/or the PSTN 160 via the associated one of the ultra high-speed links $135_V$, $135_D$, $135_T$ to the aggregator sub-component 200. For example, a packet from the video server farm 140 that represents a video frame (hereinafter, a "downstream video packet") arrives along ultra high-speed link $135_V$ and is processed by core network interface $280_V$. The control unit 262 knows that the received packet is a downstream video packet (as opposed to a downstream data packet or a downstream voice packet) based upon the particular core network interface (in this case, core network interface $280_V$) at which was received. The downstream video packet may be converted by core network interface $280_V$ into a form that may be analyzed by the control unit 262 and redirected by the switching unit 264 onto the appropriate internal high-speed link.

Specifically, based on the content of the downstream video packet, the control unit 262 can identify whether the downstream video packet should be directed to one aggregator sub-module or another. For example, the downstream video packet may include a header and a payload, where the header includes information about a particular CPD for which the packet is destined (e.g., in the form of an IP address for the particular CPD). Based on this information and on knowledge of how the CPDs 110 are distributed geographically, the control unit 262 instructs the switching unit 264 to direct the downstream video traffic to aggregator interface $270_V$ or aggregator interface $275_V$, both of which are configured to handle downstream video packets but are associated with different aggregator sub-components serving different geographic regions.

In this case, the downstream video packet representing the video frame can be sent towards the aggregator sub-component 200 on internal high-speed link $255_V$, which is dedicated to carrying video traffic. Naturally, aggregator interface $270_V$ may convert the downstream video packet into a form suitable for transmission across internal high-speed link $255_V$. It should be appreciated that in other embodiments, a certain amount of multiplexing may be performed in order to transport the downstream video packet together with downstream packets in other traffic categories over the same internal high-speed link. In any event, the downstream video packet then arrives at core network port $250_V$ of the aggregator sub-component 200.

Although the above description focused on packets belonging to the video traffic category, similar operations would take place in the case of traffic from other categories, such as packets representing telephone conversations (i.e., downstream voice packets) and/or packets representing data received via the core packet switched network 150 (i.e., downstream data packets). In each case, knowledge of the traffic category to which a particular received downstream packet belongs is obtained from knowledge of the core network interface at which the packet was received, and in each case the correspondence between a particular packet's traffic category and the identity of the aggregator interface that processes the particular packet is preserved.

Outside Plant Unit

Figure 3:
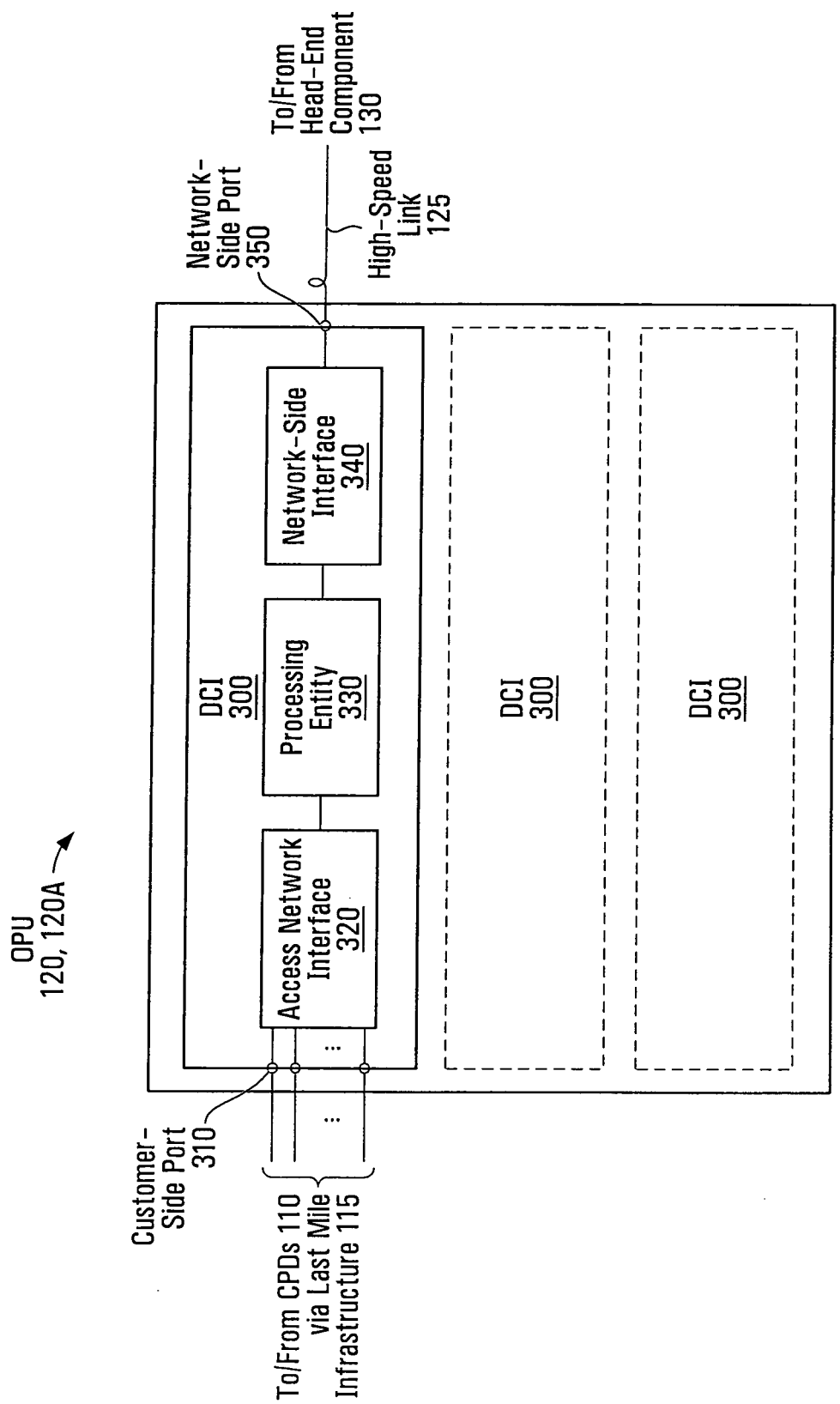
FIG. 3 is a block diagram showing components of a Dedicated Customer Interface (DCI) module located within one embodiment of the Outside Plant Unit (OPU)

By way of illustrative non-limiting embodiment, FIG. 3 shows certain components of a particular one of the OPUs 120, hereinafter denoted 120A. OPU 120A includes at least one instance of a dedicated customer interface (DCI) module, which may also be referred to as a "line card" or simply as a "DCI". OPU 120A may contain a cluster of one (1) or more DCI modules 300 within a single physical structure (e.g., chassis). In the illustrated embodiment, three (3) DCI modules 300 are shown, but this is not to be considered as a limitation of the present invention.

In one embodiment of OPU 120A, it may be beneficial to implement certain switching functionality between the DCI modules 300 in order to direct traffic more efficiently. In such a case, a "switching sub-component" (not shown) is interconnected to the plurality of DCI modules 300 via a backplane (not shown). In another embodiment of OPU 120A, no dedicated switching hardware is used. Instead, the plurality of DCI modules 300 are connected to form a "daisy chain" that removes the need for dedicated hardware to perform switching between cards. This embodiment will be described in more detail later.

The DCI modules 300 will now be described in further detail. For simplicity, let it be assumed that OPU 120A contains a single DCI module denoted 300A. The DCI module 300A is comprised of a set of customer-side ports 310, an access network interface 320, a processing entity 330, a network-side interface 340, and a network-side port 350.

The DCI module 300A may be thought of as having a "customer side" and a "network side". The "customer side" of the DCI module 300A is in communication with the various CPDs 110 that are serviced by OPU 120A, while the "network side" of DCI module 300A is communicatively coupled to the head-end component 130.

The "network side" of the DCI module 300A includes the network-side interface 340 and the network-side port 350. The network-side interface 340 allows communication over a respective one of the high-speed links 125 via the network-side port 350. For example, if the high-speed links 125 are optical fiber links, the network-side interface 340 may include electrical-to-optical (and optical-to-electrical) conversion circuitry in order to convert electrical signals to optical signals and vice-versa. The network-side interface 340 may also comprise formatting of electrical signals into a format that is compatible with the other components of the DCI module 300A, and in particular with the processing entity 330 and/or the access network interface 320.

The "customer side" of the DCI module 300A includes the customer-side ports 310 and the access network interface 320. The customer-side ports 310 include one port for each CPD that is served by the DCI module 300A. The access network interface 320 implements a signaling protocol compatible with the last-mile infrastructure 115 deployed between OPU 120A and the CPDs 110 it serves. For example, in the case where the last-mile infrastructure 115 is comprised of twisted-pair copper cable, the access network interface 320 may implement an xDSL encoding and modulation scheme. Where the last-mile infrastructure 115 is comprised of wireless links (such as WiFi or WiMAX links, or WCDMA, BFA or 3G micro base stations), the access network interface 320 may implement wireless protocols suitable for use with WiFi or WiMAX receivers. Where the last-mile infrastructure 115 is based on power-line connections, the access network interface 320 may be equipped with suitable BPL receivers. Indeed, the last-mile infrastructure 115 may be formed of a mix of wired and wireless media (e.g., a wired portion for proximate CPDs and a wireless portion for less-proximate CPDs). The access network interface 320 and the customer-side ports 310 can be suitably adapted to such circumstances.

The processing entity 330 analyzes and processes packets received from both the customer-side ports 310 and the network-side port 350. In the case where a downstream packet is received from the network-side port 350, the processing entity 330 can be used to analyze the downstream packet to identify a destination CPD, i.e., one of the CPDs 110 towards which the downstream packet is destined. This information can be learned by consulting a header of the packet. Once the destination CPD has been determined for the downstream packet, the processing entity 330 can formulate the packet such that when it is interpreted by the access network interface 320, the latter will know to release it via the correct one of customer-side ports 310 (i.e., the one leading to the destination CPD).

The processing entity 330 can also process packets travelling in the opposite (i.e., upstream) direction, namely an upstream packet that was sent from a particular one of the CPDs 110 and that arrives at one of the customer-side ports 310. In this case, the access network interface 320 aggregates many such received upstream packets and sends them towards the processing entity 330. The processing entity 330 then may simply channel the upstream packets towards the network-side interface 340 for transmission to the head-end component 130 via the network-side port 350.

Thus, it will be appreciated that individual ones of the high-speed links 125 carry traffic in various traffic categories that is destined for (and originating from) multiple CPDs 110. The traffic categories may include video, voice and/or data, as well as possibly additional or alternate traffic categories. However, bandwidth constraints on the high-speed links 125 can cause the potential for a traffic bottleneck to develop at both ends of a given one of the high-speed links 125 as packets from the different traffic categories that are destined for (or originating from) different CPDs 110 (and/or different end user devices) vie for transfer along the given one of the high-speed links. The development of such a bottleneck may impact the quality of service (QoS) of one or more services (e.g., related to voice, data and/or video communication) as perceived by one or more of the end user devices that share the bandwidth available on the given one of the high-speed links 125.

Service Hierarchy

The head-end component 130 functions to deliver traffic in the various traffic categories to the CPDs 110 at an acceptable quality of service in each traffic category despite the existence of bandwidth constraints (whether inherent or artificially imposed) on the high-speed links 125. According to an embodiment of the invention, therefore, QoS management can be achieved by implementing a "service hierarchy", whereby one category of traffic is prioritized over others. In this embodiment, packets that belong to the prioritized traffic category receive preferential access to the high-speed links 125 that would allow their transfer and delivery to become more regular and predictable than would otherwise be the case.

In a non-limiting example of a service hierarchy, packets in a first traffic category are given priority over packets in any other traffic category. For example, "video packets" (e.g., packets belonging to the video traffic category and that may represent encoded video frames of a movie or television show) can be given priority over both "voice packets" (e.g., packets belonging to the voice traffic category and that may represent encoded speech frames) and "data packets" (e.g., packets belonging to the data traffic category and that may represent data obtained from a server on the packet-switched network) which belong to the voice and data traffic categories, respectively. Other service hierarchies are of course possible, including multi-level service hierarchies, whereby packets in a first traffic category are given priority over packets in a second traffic category and traffic in the second traffic category are given priority over packets in a third traffic category.

The service hierarchy can be used to regulate the flow of the traffic along the high-speed links 125 through careful design of the processing entities 230 and 330 which, as previously described, belong respectively to the aggregator sub-component 200 in the head-end component 130 and to the DCI module 300A within OPU 120A. In particular, the processing entity 230 in the aggregator sub-component 200 is designed for regulating "downstream traffic", which refers to packets currently at the head-end component 130 that are destined for the various OPUs 120 to which it is connected. Analogously, the processing entity 330 in the DCI module 300A can be designed for regulating "upstream traffic", which refers to packets originating from the subtending CPDs 110 that are awaiting transmission from OPU 120A to the head-end component 130.

Aggregator Sub-Component Detailed Operation

Figure 4:
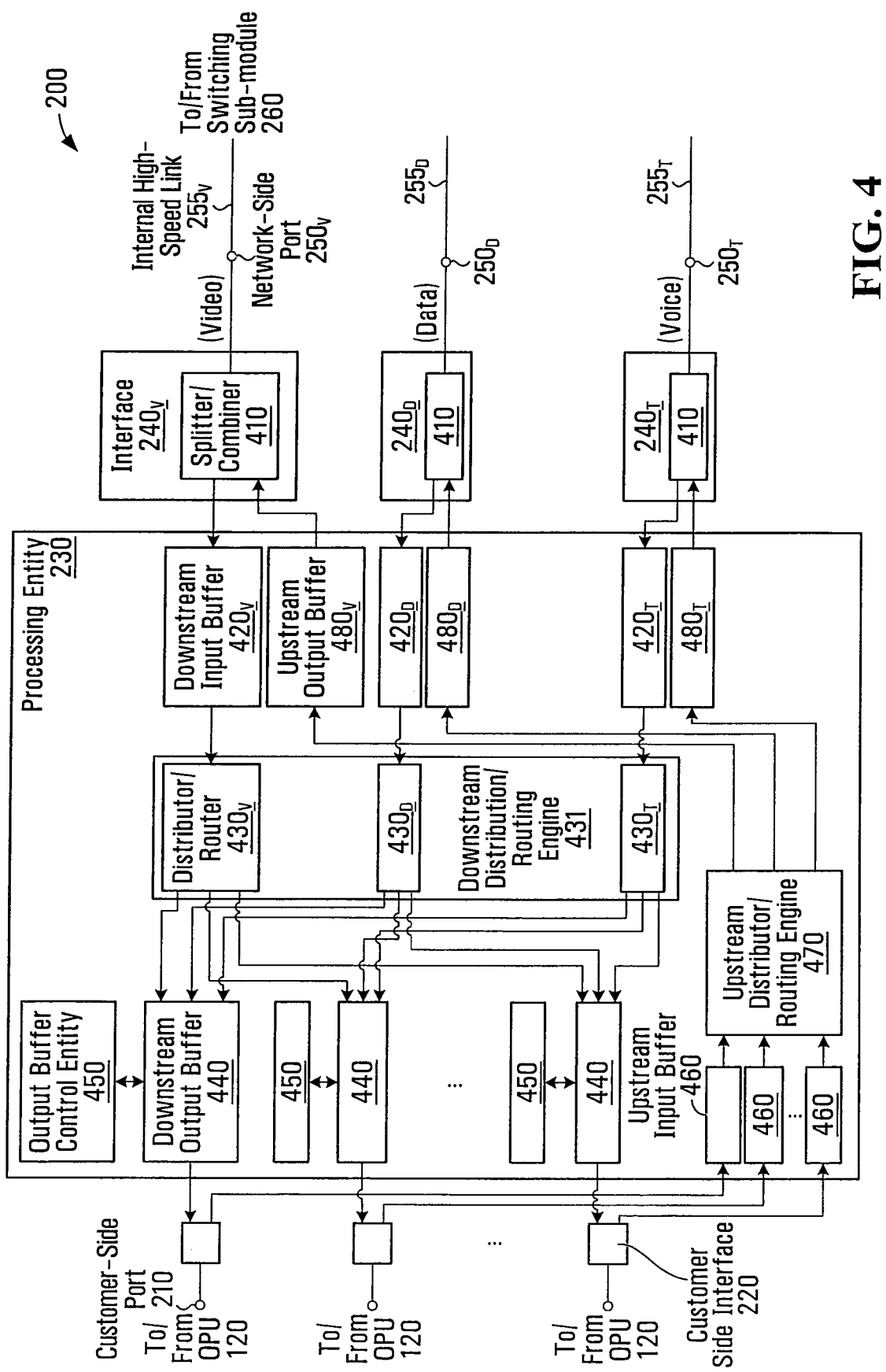
FIG. 4 is a block diagram showing components of an aggregator sub-component forming part of the head-end component illustrated in FIG. 2.

FIG. 4 shows the design of the aggregator sub-component 200, and in particular, shows the processing entity 230 and the network-side interfaces $240_V$, $240_D$, $240_T$ that are respectively associated with the network-side ports $250_V$, $250_D$, $250_T$. Where the internal high-speed links $255_V$, $255_D$, $255_T$ are bidirectional, each of the network-side interfaces $240_V$, $240_D$, $240_T$ includes a respective splitter/combiner 410 in addition to optical-to-electric and electric-to-optical conversion circuitry. The splitter/combiner 410 allows downstream traffic in a particular traffic category to co-exist with upstream traffic on the same internal high-speed link (i.e., one of the internal high-speed links $255_V$, $255_D$, $255_T$ between the aggregator sub-component 200 and the switching sub-component 260). A similar splitter/combiner may also be provided by the customer-side interfaces 220 connected to the high-speed links 125 leading to the OPUs 120.

Downstream

Operation of the processing entity 230 in the context of handling packets travelling in a downstream direction and in an upstream direction will be discussed separately. To begin with, in the context of downstream traffic, the processing entity 230 in the aggregator sub-component 200 may implement, for each traffic category, a downstream input buffer and a distributor/router. As a non-limiting example, for the video traffic category, the processing entity 230 may implement a downstream input buffer $420_V$ and a distributor/router $430_V$. Similarly, for the data traffic category, the processing entity 230 may implement a downstream input buffer $420_D$ and a distributor/router $430_D$. Finally, for the voice traffic category, the processing entity 230 may implement a downstream input buffer $420_T$ and a distributor/router $430_T$.

In addition, the processing entity 230 may implement a respective downstream output buffer 440 and a respective output buffer control entity 450 for each of the OPUs 120 to which the aggregator sub-component 200 is connected. For example, if there are five (5) OPUs connected to the aggregator sub-component 200, there can be five (5) downstream output buffers 440 and five (5) output buffer control entities 450. It should be appreciated that individual subsets of these entities can be combined into a larger structural or functional unit. Specifically, two or more of the downstream output buffers 440 could be combined into a pooled hardware memory resource, or they can each be implemented as a separate dedicated hardware memory resource.

Each of the downstream output buffers 440 is specially designed to allow the corresponding one of the output buffer control entities 450 to know the traffic category of each packet placed into that downstream output buffer.

In one embodiment, a given one of the downstream output buffers 440 can be implemented as a plurality of micro-buffers, one for each traffic category and having a respective input connected to a respective output of a respective one of the distributor/routers $430_V$, $430_D$, $430_T$. In this case, the corresponding one of the output buffer control entities 450 can selectively read from one micro-buffer or another depending on the service hierarchy being implemented.

In another embodiment, a given one of the downstream output buffers 440 can be implemented as a shared random access memory divided into a plurality of reserved blocks, one for each traffic category, where a packet is written to a particular block depending on which of the distributor/routers $430_V$, $430_D$, $430_T$ issued the packet. In this case, the corresponding one of the output buffer control entities 450 can selectively read from one block of memory or another depending on the service hierarchy being implemented.

In yet another embodiment, each of the distributor/routers $430_V$, $430_D$, $430_T$ appends auxiliary information to each of the packets it processes, where the auxiliary information is indicative of the traffic category of the packet. Thus, packets entering a given one of the downstream output buffers 440 will include an indication of their own traffic category. In this case, the corresponding one of the output buffer control entities 450 can readily implement the service hierarchy by selectively choosing to release packets from the given one of the downstream output buffers 440 based on each packet's auxiliary information.

In a further embodiment, each of the packets in a given one of the downstream packets includes a virtual local area network (VLAN) identifier, and each VLAN identifier can correspond to a VLAN that is known to be associated with a particular traffic category. For example, a table can be kept in memory which associates VLAN identifiers to traffic categories. In this way, the downstream distribution/routing engine 431 may include a single distributor/router which receives packets along a common physical port. Here, the distinction between the network-side interfaces $240_V$, $240_D$, $240_T$ is logical rather than physical.

It should be noted that the term "buffer" as used above is merely representative, since its implementation could be generally in the form of a temporary storage area with a corresponding memory management function that allows flexibility in writing to and/or reading from the storage area.

The distributor/routers $430_V$, $430_D$, $430_T$ provide distribution and routing functionality for downstream packets in each respective traffic category. To illustrate, consider downstream video packets, which are received via network-side port $250_V$ and network-side interface $240_V$. Upon receipt of a given downstream video packet, distributor/router $430_V$ identifies a particular one of the OPUs 120 that the given downstream video packet is destined for. This can be done by analyzing a header of the given downstream video packet in order to identify a destination CPD, i.e., one of the CPDs 110 towards which the given downstream video packet is destined. Then, on the basis of a mapping (which can be stored in a memory accessible to distributor/router $430_V$), distributor/router $430_V$ identifies the particular one of the OPUs 120 towards which the given downstream video packet is destined. Subsequently, distributor/router $430_V$ routes the given downstream video packet to a particular one of the downstream output buffers 440 that corresponds to the particular one of the OPUs 120 that was identified. The downstream video packet is then written to the appropriate micro-buffer or memory block associated with the video traffic category.

Similarly, consider downstream data packets that are received via network-side port $250_D$ and network-side interface $240_D$. Upon receipt of a given downstream data packet, distributor/router $430_D$ identifies a particular one of the OPUs 120 that the given downstream data packet is destined for. This can be done by analyzing a header of the given downstream data packet in order to identify a destination CPD, i.e., one of the CPDs 110 towards which the given downstream data packet is destined. Then, on the basis of a mapping (which can be stored in a memory accessible to distributor/router $430_D$), distributor/router $430_D$ identifies the particular one of the OPUs 120 towards which the given downstream data packet is destined. Subsequently, distributor/router $430_D$ routes the given downstream data packet to a particular one of the downstream output buffers 440 that corresponds to the particular one of the OPUs 120 that was identified. The given downstream data packet is then written to the appropriate micro-buffer or memory block associated with the data traffic category.

Finally, consider downstream voice packets, which are received via network-side port $250_T$ and network-side interface $240_T$. Upon receipt of a given downstream voice packet, distributor/router $430_T$ identifies a particular one of the OPUs 120 that the given downstream voice packet is destined for. This can be done by analyzing a header of the given downstream voice packet in order to identify a destination CPD, i.e., one of the CPDs 110 towards which the given downstream voice packet is destined. Then, on the basis of a mapping (which can be stored in a memory accessible to distributor/router $430_T$), distributor/router $430_T$ identifies the particular one of the OPUs 120 towards which the given downstream voice packet is destined. Subsequently, distributor/router $430_T$ routes the given downstream voice packet to a particular one of the downstream output buffers 440 that corresponds to the particular one of the OPUs 120 that was identified. The given downstream voice packet is then written to the appropriate micro-buffer or memory block associated with the voice traffic category.

It should be noted that the distributor/routers $430_V$, $430_D$, $430_T$ do not need to analyze or otherwise process each downstream packet's header to ascertain the traffic category to which it belongs. This is because only downstream video packets will arrive at distributor/router $430_V$ by virtue of their arrival via network-side port $250_V$, while only downstream data packets will arrive at distributor/router $430_D$ by virtue of their arrival via network-side port $250_D$, and only downstream voice packets will arrive at distributor/router $430_T$ by virtue of their arrival via network-side port $250_T$.

It should also be noted that the distributor/routers $430_V$, $430_D$, $430_T$ can be implemented as separate physical devices or they can be individual software or firmware components forming part of a larger module. Indeed, the distributor/routers $430_V$, $430_D$, $430_T$ can be conceptually thought of as forming an overarching downstream distribution/routing engine 431.

At this point, it should be apparent that downstream packets in various traffic categories (i.e., video, data and voice) that are destined for a common one of the OPUs (associated with a given one of the downstream output buffers 440) will find themselves awaiting transmission in the same given one of the downstream output buffers 440. These downstream packets compete for transmission along a common one of the (bandwidth-constrained) high-speed links 125 leading to the common one of the OPUs 120. To avoid or alleviate potential congestion caused by competition between downstream packets for transmission on this link (and the likely negative impact on customer experience that such congestion would cause), the contents of the given one of the downstream output buffers 440 are released in accordance with a service hierarchy that is implemented by the corresponding one of the output buffer control entities 450.

Specifically, each of the output buffer control entities 450 is configured to prioritize the manner in which the downstream packets in the corresponding one of the downstream output buffers 440 are transmitted to the corresponding one of the customer-side interfaces 220 (and eventually via the corresponding one of the customer-side ports 210). By "prioritization", it is meant that one or more downstream packets in one traffic category (and identifiable as such by virtue of the micro-buffer or memory block in which it is located, or by other means) are released before downstream packets in another traffic category, even though both sets of packets await transmission at the same time. More specifically, "prioritization" can be interpreted to cover the case where all buffered packets in a first traffic category are released before any buffered packets in a second traffic category are released. In accordance with one non-limiting alternative, "prioritization" can be interpreted to cover the case where, on average, for each buffered packet in a second category that is released, a greater number of buffered packets in a first traffic category will be released.

Each of the output buffer control entities 450 may also be configured to carry out a prior step of determining whether prioritization is required and then carrying out the aforementioned prioritization as a function of whether or not it was determined that prioritization is required. In particular, if a situation was identified where prioritization is required, then prioritization may be carried out as previously described.

In order to identify situations where prioritization is required, a given one of the output buffer control entities 450 may be configured to detect the presence of congestion on the corresponding one of the high-speed links 125 leading from the corresponding one of the customer-side ports 210 to the corresponding one of the OPUs 120. This can be measured indirectly through monitoring of an "occupancy level" of the corresponding one of the downstream output buffers 440. The term "occupancy level" can refer to an indication of the number of packets that are currently awaiting transmission, either on an absolute basis (e.g., number of packets) or on a relative basis (e.g., as a percentage of total buffer capacity). In one approach, a certain threshold buffer occupancy level could be established which, when reached, indicates to the given one of the output buffer control entities 450 that prioritization of packets becomes necessary. In some embodiments, prioritization can be triggered as soon as the threshold buffer occupancy level is exceeded by the occupancy level of the corresponding one of the downstream output buffers 440, whereas in other embodiments, it may be specified that the threshold buffer occupancy level needs to be continually exceeded for a certain amount of time before prioritization is triggered.

Another approach consists of the given one of the output buffer control entities 450 monitoring a rate of change of the occupancy level of the corresponding one of the downstream output buffers 440. When the rate of change of the occupancy level exceeds a certain predefined threshold, then prioritization may be triggered by the given one of the output buffer control entities 450, irrespective of the actual occupancy level within the corresponding one of the downstream output buffers 440. In some embodiments, prioritization can be triggered as soon as the threshold is exceeded by the rate of change of the occupancy level of the corresponding one of the downstream output buffers 440, whereas in other embodiments, it may be specified that the threshold needs to be continually exceeded for a certain amount of time before prioritization is triggered.

The above techniques are non-limiting examples of how an individual one of the output buffer control entities 450 may use the occupancy level of the corresponding one of the downstream output buffers 440 to implement a service hierarchy by carrying out packet prioritization. The above techniques can be supplemented by adding multiple threshold values that allow the individual one of the output buffer control entities 450 to control the packet prioritization process with a greater degree of refinement.

For example, attainment of a certain first threshold occupancy level may trigger prioritization of packets for a first traffic type, such as video packets, with these packets being given preferential access to the corresponding one of the high-speed links 125. If the occupancy level of the corresponding one of the downstream output buffers 440 continues to rise, it may attain a second threshold, at which point the individual one of the output buffer control entities 450 allows both video packets and, say, voice packets to benefit from preferential access to the corresponding one of the high-speed links 125. Through the use of such threshold values, the process of packet prioritization may be adjusted by the individual one of the output buffer control entities 450 based on the occupancy level of the corresponding one of the downstream output buffers 440.

Of course, those skilled in the art will recognize that further variants and possibilities exist that would fall within the scope of the present invention.

For example, different ones of the output buffer control entities 450 may implement different service hierarchies. In this way, the service hierarchy can be independently adjusted for each group of customers.

Also, still other techniques exist in order to identify situations where prioritization is required. For example, the need for prioritization of packets in certain traffic categories may be based on statistical behaviour patterns during certain times of day. For example, during the daytime hours of the work week, it may be desirable to prioritize voice packets, whereas during evenings it may be desirable to prioritize video packets, and during weekends, it may be desirable to prioritize data packets. These are merely examples, and other possibilities exist without departing from the scope of the present invention.

By applying the above methodology at multiple ones of the downstream output buffers 440 and corresponding output buffer control entities 450, a service hierarchy can be implemented for all traffic heading to the OPUs 120 that are connected to the aggregator sub-component 200. In particular, the network access provider can achieve control over the rate of downstream data entering the high-speed links 125 between the head-end component 130 and the OPUs 120. Such control allows the network provider to provide true service-based QoS, which prioritizes some services at the expense of others when there is contention between packets for available bandwidth along a high-speed link, such as the high-speed links 125 between the head-end component 130 and the OPUs 120.

Meanwhile, it will be observed that the manner in which the flow of packets is regulated is independent of the higher-layer connections (e.g., at layer 3) to which those packets may belong. For example, assume that a user at a given one of the CPDs 110 has initiated a browser session (over the core packet-switched network 150), is watching a television show (delivered from the video server farm 140) and is on the telephone (using the PSTN 160). In this case, each individual application running on each individual end user device may make its own priority "demands" for downstream bandwidth. However, these demands are largely inconsequential since it is the head-end component 130 (and more particularly, the aggregator sub-component 200) that implements prioritization of packets. More specifically, the relevant output buffer control entity 450 can ensure that a desired service hierarchy is respected, which could, but need not, include the prioritization of video traffic over voice traffic, etc.

It should also be appreciated that the service hierarchy could be dynamic, in the sense that the traffic categories being given the highest (or lowest, etc.) priority can change over time, as can the thresholds (e.g., occupancy level, rate of change of occupancy level, etc.) that may be used to trigger prioritization. All these factors contribute to allowing the network access provider to enter into true service level agreements (TSLAs) that reflect the implementation of a service hierarchy (based on traffic categories) rather than on providing access to a total amount of bandwidth.

Upstream

Turning now to the case of upstream traffic, packets originating at a given one of the CPDs 110 travel to the corresponding one of the OPUs 120 and then to the head-end component 130. In the upstream direction, regulation of traffic flow is optional. In some cases, it may not even be required if the upstream bandwidth on the high-speed links 125 is sufficient. Where regulation of upstream traffic is carried out, it can be regulated at the OPUs 120 prior to packets entering the high-speed links 125. Examples of achieving such traffic control will be described later. For the time being, assuming that upstream packets have reached the head-end component 130, these will be processed by certain components of the aggregator sub-component 200.

Specifically, the aggregator sub-component 200 routes upstream traffic according to the traffic category to which each packet belongs. In particular, the processing entity 230 includes a plurality of upstream input buffers 460, each of which corresponds to one of the OPUs 120 to which the aggregator sub-component 200 is connected. In addition, the processing entity 230 includes a plurality of upstream output buffers $480_V$, $480_D$, $480_T$, each of which corresponds to a respective traffic category, in this case, video, data and voice, respectively. Also, the processing entity 230 includes an upstream distributor/router 470 that receives upstream packets from the upstream input buffers 460 and routes the packets according to traffic type towards the upstream output buffers $480_V$, $480_D$, $480_T$. In other words, the distributor/router 470 sends upstream video packets to upstream output buffer $480_V$, upstream data packets to upstream output buffer $480_D$ and upstream voice packets to upstream output buffer $480_T$. Knowledge of the traffic category to which an upstream packet belongs can be obtained from the upstream packet itself. For example, where the upstream packet includes a header or tag indicative of a VLAN, the distributor/router 470 can look up the identity of the VLAN in a memory to identify the traffic category of the upstream packet. The distributor/router 470 is assumed to have sufficient processing capacity to handle all the packets in all the upstream input buffers 460 without causing a build-up in any particular one of the upstream input buffers 460.

At the upstream output buffers $480_V$, $480_D$, $480_T$, the upstream packets in the relevant traffic category are released towards the respective one of the network-side interfaces $240_V$, $240_D$, $240_T$. At the end of this process, the splitter/combiner 410 within each of the network-side interfaces $240_V$, $240_D$, $240_T$ allows the upstream packets to proceed towards the switching sub-component 260 over the respective one of the internal high-speed links $255_V$, $255_D$, $255_T$. It can be assumed that available bandwidth on the internal high-speed links $255_V$, $255_D$, $255_T$ is sufficiently high that contention for bandwidth by upstream packets would be unlikely or insignificant. Such an assumption is reasonable, since the internal high-speed links $255_V$, $255_D$, $255_T$ exist within the head-end component 130 which is under the control of the network access provider. Instead, contention for bandwidth by upstream packets, if any, may occur when considering the high-speed links 125 between the OPUs 120 and the aggregator sub-component 200.

Dedicated Customer Interface (DCI) Module Detailed Operation

Figure 5:
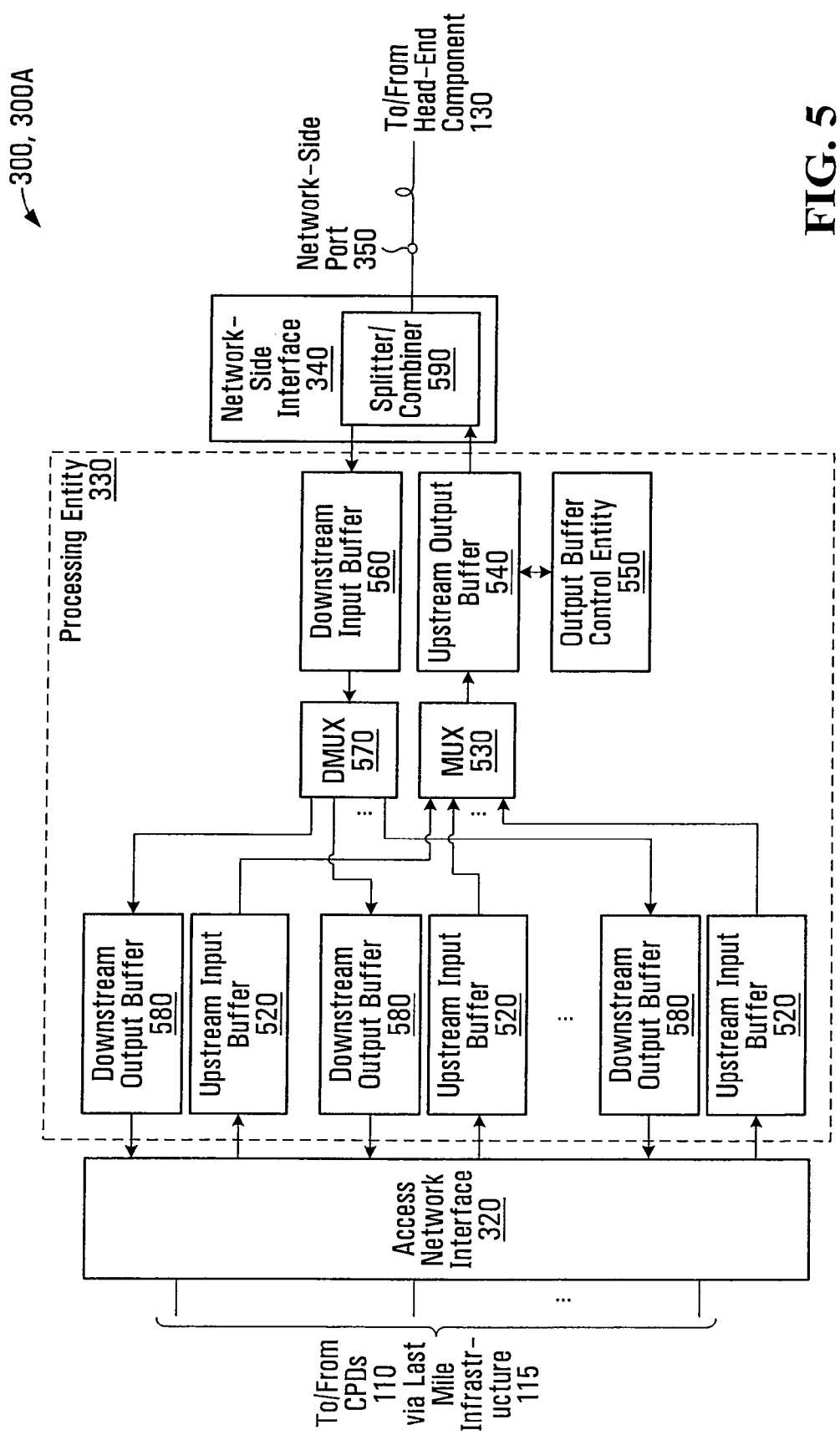
FIG. 5 is a block diagram showing components of the DCI module.

Reference is now made to FIG. 5, which shows the design of certain components of the DCI module 300A forming part of OPU 120A. Where the high-speed link between OPU 120A is bidirectional, the network-side interface 340 includes a splitter/combiner 590 in addition to optical-to-electric and electric-to-optical conversion circuitry. The splitter/combiner 590 allows downstream traffic arriving from the head-end component 130 and destined for individual CPDs to co-exist with upstream traffic on the same high-speed link (i.e., one of the high-speed links 125 between OPU 120A and the aggregator sub-component 200). A similar splitter/combiner may also be provided by the customer-side interfaces 220 connected to the high-speed links 125 leading to the OPUs 120.

Those skilled in the art will appreciate that a similar splitter/combiner (not shown) may also be implemented in the access network interface 320 in order to allow downstream and upstream traffic to be exchanged with the CPDs 110 over the last mile infrastructure 115.

Upstream

Operation of the processing entity 330 in the context of handling packets travelling in a downstream direction and in an upstream direction will be discussed separately. To begin with, in the context of upstream traffic, the processing entity 330 in OPU 120A may implement an upstream input buffer 520 for each of the CPDs 110 connected to the customer-side ports 310 via the last mile infrastructure 115. In addition, the processing entity 330 may also implement a multiplexer (MUX) 530, as well as an upstream output buffer 540 and an output buffer control entity 550. The upstream output buffer 540 has an output connected to the network-side interface 340 and, more specifically, to the splitter/combiner 590.

Individual upstream packets could carry traffic in various traffic categories (e.g., video, data, voice, etc.) and originate from various ones the CPDs 110. However, in all cases the upstream packets are destined for the same head-end component 130. Accordingly, the MUX 530 implements a multiplexing function for the upstream packets. More specifically, the MUX 530 combines upstream packets from various ones of the CPDs 110 in order to place them into the upstream output buffer 540. These upstream packets compete for transmission along the individual one of the high-speed links 125 leading to the head-end component 130. To avoid or alleviate potential congestion caused by competition between upstream packets for transmission on this link (and the likely negative impact on customer experience that such congestion would cause), the contents of the given one of the upstream output buffer 540 are released in accordance with a service hierarchy that is implemented by the corresponding one of the output buffer control entities 550.

Specifically, the output buffer control entity 550 is configured to prioritize the manner in which the upstream packets in the upstream output buffers 540 are transmitted to the network-side interface 340 (and eventually via the network-side port 350). By "prioritization", it is meant that one or more upstream packets in one traffic category are released before upstream packets in another traffic category, even though both sets of packets await transmission at the same time. In order to allow the output buffer control entity 550 to determine the traffic category of a given upstream packet, the given upstream packet can include a VLAN identifier corresponding to a VLAN that is known to be associated with a particular traffic category. A table can be kept in memory which associates VLAN identifiers to traffic categories.

In particular, the "prioritization" carried out by the output buffer control entity 550 can cover the case where all buffered packets in a first traffic category are released before any buffered packets in a second traffic category are released. In accordance with one non-limiting alternative, "prioritization" can be interpreted to cover the case where, on average, for each buffered packet in a second category that is released, a greater number of buffered packets in a first traffic category will be released.

The output buffer control entity 550 may also be configured to carry out a prior step of determining whether prioritization is required and then carrying out the aforementioned prioritization as a function of whether or not it was determined that prioritization is required. In particular, if a situation was identified where prioritization is required, then prioritization may indeed be carried out as previously described.

In order to identify situations where prioritization is required, the output buffer control entity 550 may be configured to detect the presence of congestion on the particular one of the high-speed links 125 leading from OPU 120A to the aggregator sub-component 200 of the head-end component 130. This can be measured indirectly through monitoring of an "occupancy level" of the upstream output buffer 540. The term "occupancy level" can refer to an indication of the number of packets that are currently awaiting transmission, either on an absolute basis (e.g., number of packets) or on a relative basis (e.g., as a percentage of total buffer capacity). In one approach, a certain threshold buffer occupancy level could be established which, when reached, indicates to the output buffer control entity 550 that prioritization of packets becomes necessary. In some embodiments, prioritization can be triggered as soon as the threshold buffer occupancy level is exceeded by the occupancy level of the upstream output buffer 540, whereas in other embodiments, it may be specified that the threshold buffer occupancy level needs to be continually exceeded for a certain amount of time before prioritization is triggered.

Another approach consists of the output buffer control entity 550 monitoring a rate of change of the occupancy level of the upstream output buffer 540. When the rate of change of the occupancy level exceeds a certain predefined threshold, then prioritization may be triggered by the output buffer control entity 550, irrespective of the actual occupancy level within the upstream output buffer 540. In some embodiments, prioritization can be triggered as soon as the threshold is exceeded by the rate of change of the occupancy level of the upstream output buffer 540, whereas in other embodiments, it may be specified that the threshold needs to be continually exceeded for a certain amount of time before prioritization is triggered.

The above techniques are non-limiting examples of how the output buffer control entity 550 may use the occupancy level of the upstream output buffer 540 to carry out a service hierarchy and trigger packet prioritization. The above techniques can be supplemented by adding multiple threshold values that allow the output buffer control entity 550 to control the packet prioritization process with a greater degree of refinement.

For example, attainment of a certain first threshold occupancy level may trigger prioritization of packets for a first traffic type, such as video packets, with these packets being given preferential access to the particular one of the high-speed links 125. If the occupancy level of the corresponding upstream output buffer 540 continues to rise, it may attain a second threshold, at which point the output buffer control entity 550 allows both video packets and, say, voice packets to benefit from preferential access to the particular one of the high-speed links 125. Through the use of such threshold values, the process of packet prioritization may be adjusted by the output buffer control entity 550 based on the occupancy level of the upstream output buffer 540.

Of course, those skilled in the art will recognize that further variants and possibilities exist that would fall within the scope of the present invention.

Also, still other techniques exist in order to identify situations where prioritization is required. For example, the need for prioritization of packets in certain traffic categories may be based on statistical behaviour patterns during certain times of day. For example, during the daytime hours of the work week, it may be desirable to prioritize voice packets, whereas during evenings it may be desirable to prioritize video packets, and during weekends, it may be desirable to prioritize data packets. These are merely examples, and other possibilities exist without departing from the scope of the present invention.

By applying the above methodology, a service hierarchy can be implemented for all traffic heading from OPU 120A to the head-end component 130. In particular, control over the rate of upstream data entering the particular high-speed link 125 between OPU 120A and the head-end component 130 can be established. Such control allows the network provider to provide true service-based QoS, which prioritizes some services at the expense of others when there is contention between packets for available bandwidth along the high-speed link between OPU 120A and the head-end component 130.

Meanwhile, it will be observed that the manner in which the flow of packets is regulated is independent of the higher-layer connections (e.g., at layer 3) to which those packets may belong. For example, assume that a user at a given one of the CPDs 110 has initiated a browser session (over the core packet-switched network 150), is watching a television show (delivered from the video server farm 140) and is on the telephone (using the PSTN 160). In this case, each individual application running on each individual end user device may make its own priority "demands" for upstream bandwidth. However, these demands are largely inconsequential since it is the individual OPUs 120 that implement prioritization of packets. More specifically, the relevant output buffer control entity 550 can ensure that a desired service hierarchy is respected, which could, but need not, include the prioritization of video traffic over voice traffic, etc.

It should also be appreciated that the service hierarchy could be dynamic, in the sense that the traffic categories being given the highest (or lowest, etc.) priority can change over time, as can the thresholds (e.g., occupancy level, rate of change of occupancy level, etc.) that may be used to trigger prioritization. All these factors contribute to allowing the network access provider to enter into true service level agreements (TSLAs) that reflect the implementation of a service hierarchy (based on traffic categories) rather than on providing access to a total amount of bandwidth.

It should further be noted that the term "buffer" as used above is merely representative, since its implementation could be generally in the form of a temporary storage area with a corresponding memory management function that allows flexibility in writing to and/or in reading from the storage area.

Downstream

In the context of downstream traffic, the processing entity 330 in OPU 120A may implement a downstream input buffer 560 and a de-multiplexer (DMUX) 570. In addition, the processing entity 330 may also implement a downstream output buffer 580 for each of the CPDs 110 connected to the customer-side ports 310 via the last mile infrastructure 115. The downstream input buffer 560 temporarily stores downstream packets that arrive from the head-end component 130.

Individual downstream packets could be destined for various ones the CPDs 110. Accordingly, the DMUX 570 implements a demultiplexing function for the downstream packets. More specifically, for each downstream packet, the DMUX 570 identifies a destination CPD (i.e., one of the subtending CPDs 110 for which the downstream packet is destined). This can be achieved by examining the header of the downstream packet. Once the destination CPD for the downstream packet has been determined, the downstream packet is sent to the particular one of the downstream output buffers 580 that is associated with the destination CPD. At the particular one of the downstream output buffers 580, the downstream packet awaits transmission to the destination CPD over the last mile infrastructure 115 via the access network interface 320 and the corresponding one of the customer-side ports 310.

It can be assumed that available bandwidth in the last mile infrastructure 115 towards individual ones of the CPDs 110 is sufficiently high that contention for bandwidth by downstream packets would be unlikely or insignificant. Such an assumption is reasonable, since the overall bandwidth of the last mile infrastructure 115 (between OPU 120A and the CPDs 110) is likely to be significantly greater than the bandwidth of the individual one of the high-speed links 125 between OPU 120A and the head-end component 130. Where temporary congestion may occur, appropriate sizing of the downstream output buffer 580 could mitigate its impact.

It should be appreciated that the above description of the DCI module 300A applies to other ones of the DCI modules 300 that may be housed within a single one of the OPUs 120 in order to service a greater number of the CPDs 110.

Serial Interconnection of Dedicated Customer Interface (DCI) Modules

Figure 6:
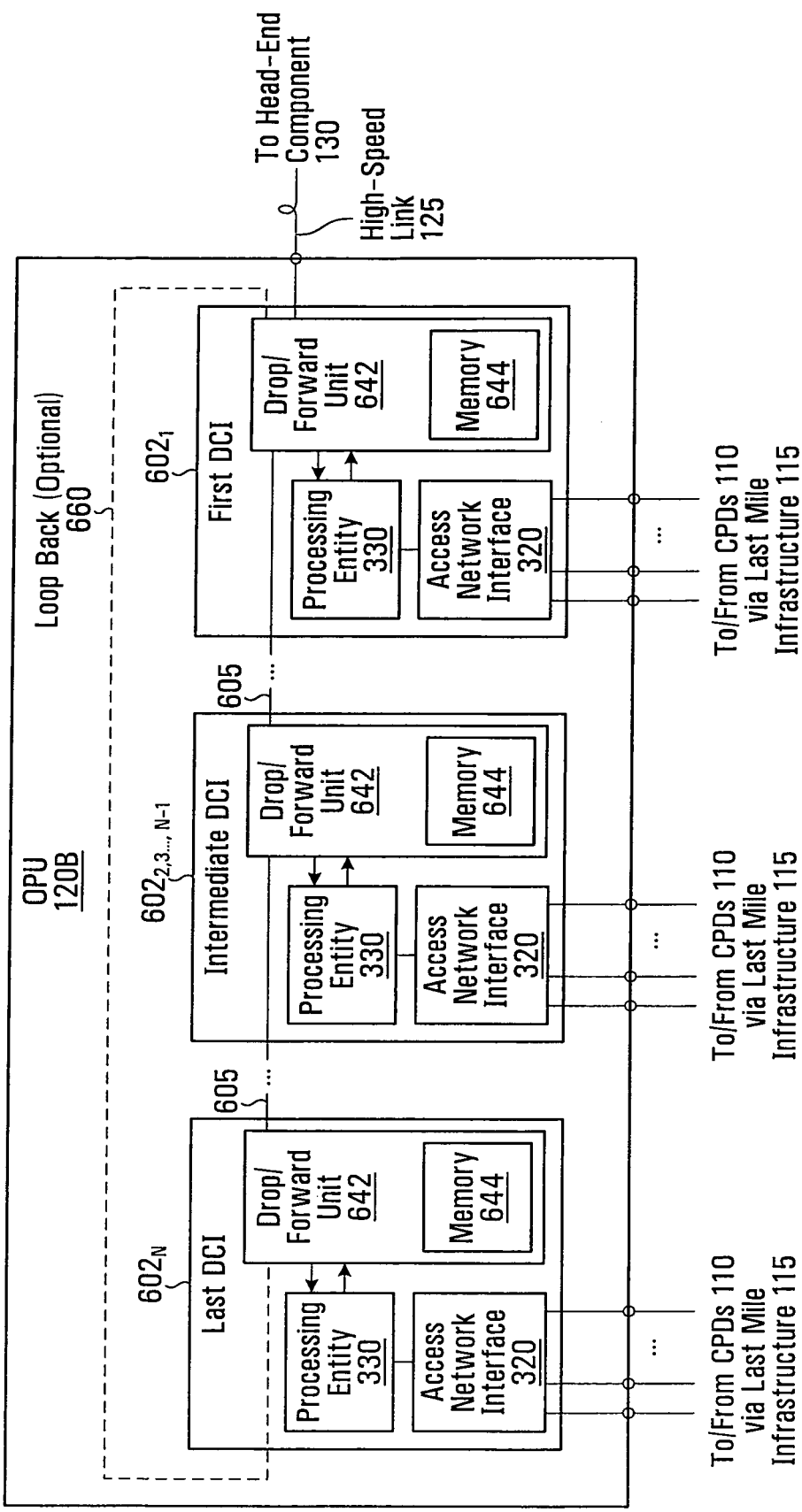
FIG. 6 is a block diagram showing multiple DCI modules within another embodiment of the OPU.

FIG. 6 shows an embodiment of an OPU 120B that contains multiple (i.e., two or more) DCI modules $602_1 \ldots _N$ arranged in a serial interconnection that can be referred to as a "daisy chain" arrangement. This allows a single high-speed link 125 between the OPU 120B and the head-end component 130 to be shared by multiple DCI modules $602_1 \ldots _N$, in contrast to the situation in FIG. 3. The DCI modules $602_1 \ldots _N$ include a designated "first" DCI module $602_1$, a last DCI module $602_N$ and a set of zero or more intermediate DCI modules $602_2 \ldots _{N4}$. The "first" DCI module $602_1$ is so named only because it is closest to the particular one of the high-speed links 125 that connects OPU 120B to the head-end component 130. Thus, the first DCI module $602_1$ is indeed the first one of the DCI modules $602_1 \ldots _N$ to receive downstream traffic from the head-end component 130.

Adjacent ones of the DCI modules $602_1 \ldots _N$ are connected by a respective one of a plurality of DCI-to-DCI connections 605. The medium and signaling protocol used for the DCI-to-DCI connections 605 could be identical to the medium and signaling protocol used by the first DCI module $602_1$ to communicate with the head-end component 130 over the particular one of the high-speed links 125. This can serve to enhance modularity.

Also provided in OPU 120B is a connection between the last DCI module $602_N$ and the first DCI module $602_1$, which is referred to as a "loop back" 660. The loop back 660, which is optional, may be used to facilitate inter-DCI-module communication and provide redundancy.

Each of the DCI modules $602_1 \ldots _N$ includes an access-network interface 620, a processing entity 630 and a drop/forward unit 642. The drop/forward unit 642 in any given one of the DCI modules $602_1 \ldots _N$ includes or has access to a memory 644, which in a non-limiting example of implementation can be a content-addressable memory (CAM). The memory 644 stores an identifier that is uniquely associated with the given one of the DCI modules $602_1 \ldots _N$. The identifier may be assigned during manufacture (e.g., a MAC address) or can be assigned during an initialization phase.

In operation, each of the DCI modules $602_1 \ldots _N$ operates in substantially the same way. Thus, the following description will focus on the first DCI module $602_1$, which is the first one of the DCI modules $602_1 \ldots _N$ to receive downstream traffic from the head-end component 130. Specifically, the drop/forward unit 642 in the first DCI module $602_1$ determines whether a given packet received from the head-end component 130 is destined for the first DCI module $602_1$. This can be achieved by reading a special "tag" that is associated with the given packet. Details regarding how the head-end component 130 associates tags with packets will be provided later on. For now, it is sufficient to understand that the destination DCI module for the given packet can be identified by virtue of the tag associated with the given packet. In particular, when the given packet is destined for a particular one of the DCI modules $602_1 \ldots _N$, the tag associated with the given packet specifies the aforesaid identifier of the particular one of the DCI modules $602_1 \ldots _N$.

Thus, by examining the tag associated with the given packet and comparing it to the identifier stored in its memory 644, the drop/forward unit 642 in the first DCI module $602_1$ can determine whether the given packet is indeed destined for first DCI module $602_1$. The use of the CAM is a particularly efficient way of obtaining a quick binary (i.e., yes or no) answer to the question of whether or not the given packet is destined for first DCI module $602_1$. In particular, where the DCI-to-DCI connections 605 are optical, an optical CAM can be used for this purpose. However, it should be understood that a conventionally addressable memory could also be used instead of a CAM.

If the drop/forward unit 642 in the first DCI module $602_1$ finds a match between the tag associated with the given packet and the identifier stored in its memory 644, the drop/forward unit 642 in the first DCI module $602_1$ can conclude that the given packet is indeed destined for first DCI module $602_1$. In this case, the drop/forward unit 642 sends the given packet to the processing entity 330 of the first DCI module $602_1$ where processing is carried out as previously described. It should be noted that the tag can be removed prior to sending the given packet to the processing entity 330.

However, if the drop/forward unit 642 in the first DCI module $602_1$ finds no match between the tag associated with the given packet and the identifier stored in its memory 644, the drop/forward unit 642 in the first DCI module $602_1$ can conclude that the given packet is not destined for first DCI module $602_1$. In this case, the drop/forward unit 642 sends the given packet to the next adjacent DCI module (in this case, the second DCI module $602_2$) via the corresponding one of the DCI-to-DCI connections 605. At the second DCI module $602_2$, similar processing occurs as has been described above having regard to the first DCI module $602_1$.

In the case of upstream traffic, it should be appreciated that packets arriving from the various CPDs 110 at a "recipient DCI module" of OPU 120B do not need to be tagged. Rather, the packets can be blindly routed from the recipient DCI module to the first DCI module $602_1$ via zero or more of the intermediate DCI modules $602_2 \ldots _N$ and/or via the loop back 660. For example, at each intervening DCI module, the upstream traffic received from another DCI module in the daisy chain may be aggregated with its own upstream traffic. Ultimately, the first DCI module $602_1$ releases the aggregate upstream traffic towards the head-end component 130 over the particular one of the high-speed links 125.

Tagging of Downstream Packets at Head-End Component

Figure 7:
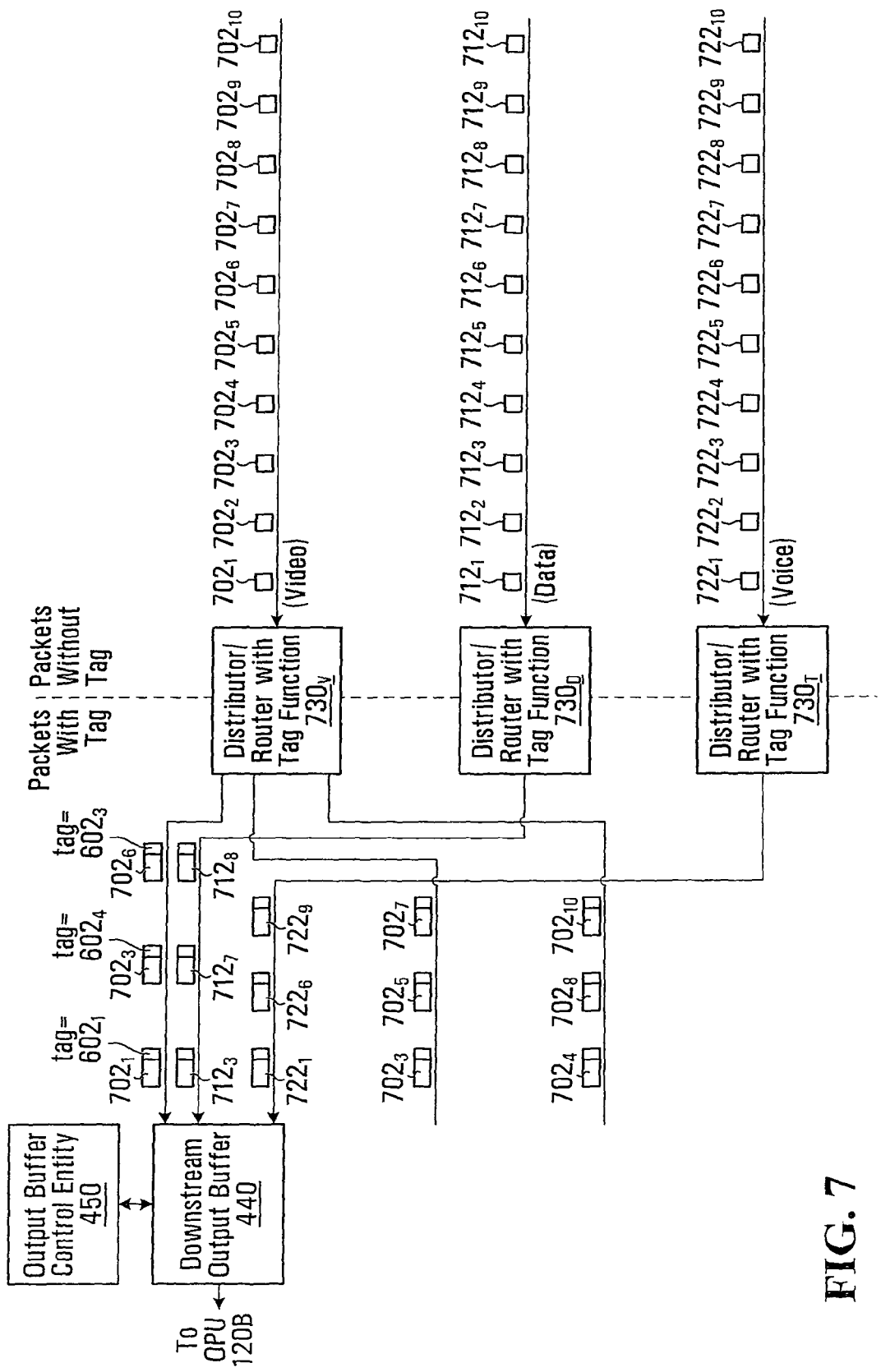
FIG. 7 is a block diagram showing how certain components of the aggregator sub-component in the head-end component tag downstream packets to identify a particular DCI module for which they are destined.

Reference is now made to FIG. 7, which depicts the manner in which downstream packets $702_1 \ldots _{10}$, $712_1 \ldots _{10}$, $722_1 \ldots _{10}$ may be tagged by the aggregator sub-component 200, and more specifically, by a plurality of distributor/routers $730_V$, $730_D$, $730_T$. Distributor/router $730_V$ is used for routing downstream video packets $702_1 \ldots _{10}$, distributor/router $730_D$ is used for routing downstream data packets $712_1 \ldots _{10}$ and distributor/router $730_T$ is used for routing downstream voice packets $722_1 \ldots _{10}$. It should be appreciated that the depiction of ten (10) packets per traffic category is merely for illustrative purposes.

The distributor/routers $730_V$, $730_D$, $730_T$ are similar to the distributor/routers $430_V$, $430_D$, $430_T$ described previously, except that they have been modified to include a tagging functionality. In particular, distributor/router $730_V$ is configured to identify a "destination DCI module" for each of the downstream video packets $702_1 \ldots _{10}$ received over internal high-speed link $255_V$. The "destination DCI module" for a given downstream video packet can be determined by identifying the specific one of the CPDs 110 for which the given downstream video packet is destined, and then consulting a mapping that indicates which CPDs 110 are connected to which DCI modules in which OPUs. Such a mapping can be stored in a memory (not shown) and maintained by the network access provider.

In order to identify the specific one of the CPDs 110 for which the given downstream video packet is destined, distributor/router $730_V$ can examine the header of the given downstream video packet. For example, if the header includes an IP address, then this address can be mapped to one of the CPDs 110, which can then be mapped to a destination DCI module. Thus, for instance, knowing that the given downstream packet is destined for a particular CPD, and upon learning that the particular CPD is connected to DCI module $602_3$, the destination DCI module for the given downstream packet would be DCI module $602_3$. It should be appreciated that distributor/router $730_V$ will already be configured to examine the headers of the downstream video packets $702_{1\ldots10}$ because the destination OPU for each such packet will need to be determined, as previously described, in order to ensure routing to the appropriate downstream output buffer 440.

Having determined the destination DCI module for the given downstream video packet, distributor/router $730_V$ tags the packet with an indication of the destination DCI module. The indication of a particular DCI module may correspond to the aforementioned identifier that is uniquely associated with the particular DCI module (which is stored in its memory 644) and that is also known to the network access provider.

In FIG. 7, by way of non-limiting example, downstream video packets $702_1$, $702_3$ and $702_6$ are all destined for CPDs that are served by various ones of the DCI modules $602_{1\ldots N}$ in OPU 120B. In particular, downstream video packet $702_1$ is destined for a CPD that is served by DCI module $602_1$ (and includes a tag indicative of DCI module $602_1$), downstream video packet $702_3$ is destined for a CPD that is served by DCI module $602_4$ (and includes a tag indicative of DCI module $602_4$) and downstream video packet $702_6$ is destined for a CPD that is served by DCI module $602_3$ (and includes a tag indicative of DCI module $602_3$). Meanwhile, downstream video packets $702_3$, $702_5$ and $702_7$ are destined for CPDs serviced by DCI modules in another one of the OPUs 120, while downstream video packets $702_4$, $702_8$ and $702_{10}$ are destined for CPDs serviced by DCI modules in yet another one of the OPUs 120, and each such downstream video packet has a tag indicative of its destination DCI module.

In order to tag the given downstream video packet, distributor/router $730_V$ can encapsulate the given downstream video packet within the payload of a super-packet and insert the identifier of the destination DCI module into a header of the super-packet. Alternatively, distributor/router $730_V$ can modify one or more bits in the existing header of the given downstream video packet. Still other techniques for tagging the given downstream video packet exist and will occur to those of ordinary skill in the art as being within the scope of the present invention.

It should be noted that the "tag" that is applied to a particular downstream video packet in order to identify its destination DCI module may, but need not, modify the format of the particular downstream packet. In other words, if the particular downstream packet is an IP packet, then the tagged version of the particular downstream packet could remain an IP packet. In a specific non-limiting example, the MAC address of the destination OPU for the particular downstream packet may be enhanced to identify not only the OPU but also the DCI module to which the particular downstream packet is destined. This can be referred to as MAC address extension.

Once tagged, distributor/router $730_V$ sends the tagged version of each given downstream video packet to the downstream output buffer 440 corresponding to the OPU to which the given downstream video packet is destined.

It should be understood that the above discussion of distributor/router $730_V$ in relation to downstream video packets $702_{1\ldots10}$ also applies to distributor/router $730_D$ and distributor/router $730_T$ in relation to downstream data packets $712_{1\ldots10}$ and downstream voice packets $722_{1\ldots10}$, respectively.

Optionally, the tag associated with a given downstream packet could also include information indicative the traffic category to which the given downstream packet belongs in order to assist the output buffer control entity 450 in implementing the previously described service hierarchy.

Those skilled in the art will appreciate that certain adaptations and modifications of the described embodiments can be made. Therefore, the above discussed embodiments are to be considered illustrative and not restrictive.

What is claimed is:

1. A method of regulating traffic flow to a plurality of customer premises devices (CPDs), each of the CPDs being reachable via a corresponding one of a plurality of outside plant units (OPUs), the method comprising:

receiving traffic in a first traffic category via a first interface dedicated to the first traffic category, the traffic in the first traffic category comprising first packets, each of said first packets being destined for a respective CPD that is among said plurality of CPDs;

receiving traffic in a second traffic category via a second interface dedicated to the second traffic category, the traffic in the second traffic category comprising second packets, each of said second packets being destined for a respective CPD that is among said plurality of CPDs;

determining a destination OPU for each of the first and second packets and, for each particular OPU that is the destination OPU for one or more packets, buffering the one or more packets and transmitting the buffered packets via an OPU interface uniquely associated with the particular OPU, the destination OPU for a particular packet being determined by identifying the OPU via which the CPD for which the particular packet is destined is reachable;

regulating packet flow via the OPU interface by prioritizing transmission of those of the buffered packets that are first packets destined for a particular OPU and received via the first interface dedicated to the first traffic category over transmission of those of the buffered packets that are second packets destined for that same OPU and received via the second interface dedicated to the second traffic category; and determining whether prioritization is required, wherein said prioritizing is carried out as a function of whether it is determined that prioritization is required, wherein said prioritizing is carried out only if it is determined that prioritization is required.

2. The method defined in claim 1, wherein each of the first and second packets comprises a header indicative of the respective CPD for which the packet is destined.

3. The method defined in claim 2, wherein determining the destination OPU for each of the first and second packets comprises examining the header of the packet to identify the respective CPD for which the packet is destined, and consulting a mapping to determine the destination OPU based on the destination CPD.

4. The method defined in claim 1, wherein buffering packets for transmission to the particular OPU comprises placing the packets into a buffer for the particular OPU, the method further comprising monitoring an occupancy level of the buffer.

5. The method defined in claim 4, wherein determining whether prioritization is required comprises determining whether the occupancy level of the buffer has exceeded a threshold occupancy level.

6. The method defined in claim 4, wherein determining whether prioritization is required comprises determining whether the occupancy level of the buffer has continuously exceeded a threshold occupancy level for more than a threshold length of time.

7. The method defined in claim 4, wherein determining whether prioritization is required comprises determining whether a rate of change of the occupancy level of the buffer has exceeded a threshold rate of change.

8. The method defined in claim 4, wherein determining whether prioritization is required comprises determining whether a rate of change of the occupancy level of the buffer has continuously exceeded a threshold rate of change for more than a threshold length of time.

9. The method defined in claim 4, wherein placing the packets into the buffer comprises sending each of the packets to an input of either a first micro-buffer or a second micro-buffer based on whether the packet is one of the first packets or one of the second packets.

10. The method defined in claim 9, further comprising identifying each of the packets as one of the first packets or one of the second packets based on whether the packet was received via the first interface or the second interface, respectively.

11. The method defined in claim 4, wherein placing the packets into the buffer comprises placing each of the packets into either a first memory area or a second memory area based on whether the packet is one of the first packets or one of the second packets.

12. The method defined in claim 11, further comprising identifying each of the packets as one of the first packets or one of the second packets based on whether the packet was received via the first interface or the second interface, respectively.

13. The method defined in claim 4, wherein placing the packets into the buffer comprises identifying each of the packets as one of the first packets or one of the second packets.

14. The method defined in claim 13, wherein identifying each of the packets as one of the first packets or one of the second packets is carried out based on whether the packet was received via the first interface or the second interface, respectively.

15. The method defined in claim 4, wherein the buffer for the particular OPU and buffers for other ones of the OPUs comprise respective dedicated hardware memory resources.

16. The method defined in claim 4, wherein the buffer for the particular OPU and buffers for other ones of the OPUs share a pooled hardware memory resource.

17. The method defined in claim 1, wherein the OPU interface is connected to the particular OPU by a communication link, and wherein determining whether prioritization is required comprises determining whether there is congestion on said communication link.

18. The method defined in claim 1, wherein determining whether prioritization is required comprises determining whether a current time of day falls within a time interval associated with a requirement for prioritization.

19. The method defined in claim 1, wherein the first and second traffic categories are each different members of the set including voice traffic, video traffic and data traffic.

20. The method defined in claim 1, wherein the first interface and the second interface are connected to distinct physical ports and are distinguishable physically.

21. The method defined in claim 1, wherein the first interface and the second interface are connected to a common physical port and are distinguishable logically.

22. The method defined in claim 21, wherein the first packets are received from a first network entity, wherein the second packets are received from a second network entity, and wherein each of the packets is transmitted in a format that allows detection of whether it was received from the first network entity or the second network entity.

23. The method defined in claim 1, wherein prioritizing transmission of those of the buffered packets that are first packets over those of the buffered packets that are second packets comprises sending all buffered first packets before sending any buffered second packet.

24. The method defined in claim 1, wherein prioritizing transmission of those of the buffered packets that are first packets over those of the buffered packets that are second packets comprises sending, for each buffered second packet, a greater number of buffered first packets.

25. The method defined in claim 1, further comprising converting the first and second packets from optical to electrical format before said buffering.

26. The method defined in claim 1, further comprising converting the buffered packets from electrical to optical format before transmitting them over the OPU interface.

27. The method defined in claim 1, further comprising:
receiving traffic in a third traffic category via a third interface dedicated to the third traffic category, the traffic in the third traffic category comprising third packets, each of said third packets being destined for a respective CPD that is among said plurality of CPDs;
determining a destination OPU for each of the third packets;
wherein said regulating further comprises prioritizing transmission of those of the buffered packets that are first packets over transmission of those of the buffered packets that are second packets or third packets.

28. The method defined in claim 27, wherein the first traffic category comprises video traffic, wherein the second traffic category comprises voice traffic and wherein the third traffic category comprises data traffic.

29. The method defined in claim 1, further comprising:
receiving upstream traffic from the OPUs via respective input interfaces, the upstream traffic comprising upstream packets each of which originates from a respective one of said CPDs;
determining a traffic category of each of said upstream packets;
releasing via said first interface those upstream packets determined to be in said first traffic category;
releasing via said second interface those upstream packets determined to be in said second traffic category.

30. The method defined in claim 29, wherein determining the traffic category of each of said upstream packets comprises consulting a header of each of said upstream packets, said header identifying the traffic category of each of said upstream packets.

31. The method defined in claim 29, wherein determining the traffic category of each of said upstream packets comprises determining a particular virtual local area network (VLAN) associated with each of said upstream packets and consulting a mapping to determine the traffic category associated with the particular VLAN.

32. The method defined in claim 29, further comprising buffering the upstream packets in the first traffic category prior to said releasing.

33. The method defined in claim 32, further comprising converting the upstream packets in the first traffic category from electrical to optical format after said buffering.

34. The method defined in claim 32, wherein buffering comprising placing the upstream packets in the first traffic category into a buffer.

35. The method defined in claim 34, wherein the buffer comprises upstream packets originating from plural ones of the CPDs.

36. The method defined in claim 34, wherein the buffer comprises upstream packets received from plural ones of the OPUs.

37. The method defined in claim 32, further comprising buffering the upstream packets in the second traffic category prior to said releasing.

38. The method defined in claim 37, further comprising converting the upstream packets in the second traffic category from electrical to optical format after said buffering.

39. The method defined in claim 37, wherein buffering comprising placing the upstream packets in the second traffic category into a second buffer.

40. The method defined in claim 39, wherein the second buffer comprises upstream packets originating from plural ones of the CPDs.

41. The method defined in claim 39, wherein the second buffer comprises upstream packets received from plural ones of the OPUs.

42. The method defined in claim 1, wherein each of the CPDs is reachable via a respective one of a plurality of dedicated customer interfaces (DCIs), wherein the DCIs are grouped into clusters included in respective ones of the outside plant units (OPUs), the method further comprising:
    determining a destination DCI for each of the first and second packets, the destination DCI for a particular packet destined for a particular CPD being determined by identifying the DCI via which the particular CPD is reachable; and
    for each particular DCI that is the destination DCI for one or more packets, tagging each of the one or more packets with an indication of the particular DCI.

43. The method defined in claim 42, wherein each of the first and second packets comprises a header indicative of the CPD for which the packet is destined, wherein determining the destination DCI and the destination OPU for each of the packets comprises examining the header of the packet to identify the CPD for which the packet is destined, and consulting a mapping to determine the destination DCI and the destination OPU based on the CPD for which the packet is destined.

44. The method defined in claim 42, wherein tagging each of the one or more packets with an indication of the particular DCI comprises associating a tag to the packet, said tag being indicative of the particular DCI.

45. The method defined in claim 44, wherein the OPU interface uniquely associated with a given one of the OPUs is connected to the given OPU by a respective communication link, wherein the method further comprises, at each given one of the OPUs, reading the tag associated with each packet received over the respective communication link, the tag associated with said packet being indicative of the destination DCI for said packet.

46. The method defined in claim 45, further comprising, at a given one of the OPUs, receiving packets over the respective communication link at a designated one of the DCIs in the cluster included in the given OPU.

47. The method defined in claim 46, further comprising the designated one of the DCIs reading the tag associated with a particular packet received over the respective communication link to determine an identity of the destination DCI for the particular packet and comparing the identity of the destination DCI to a predetermined identifier associated with the designated one of the DCIs.

48. The method defined in claim 47, wherein said comparing is carried out using a content-addressable memory.

49. The method defined in claim 47, wherein said comparing is carried out using an optical content-addressable memory.

50. The method defined in claim 47, further comprising the designated one of the DCIs forwarding the particular packet to an adjacent one of the DCIs in said cluster if the identity of the destination DCI does not match the predetermined identifier associated with the designated one of the DCIs.

51. The method defined in claim 42, wherein buffering the one or more packets comprises placing the packets into a buffer for the particular OPU.

52. The method defined in claim 51, wherein the buffer for the particular OPU and buffers for other ones of the OPUs comprise respective dedicated hardware memory resources.

53. The method defined in claim 51, wherein the buffer for the particular OPU and buffers for other ones of the OPUs share a pooled hardware memory resource.

54. The method defined in claim 51, wherein the first and second traffic categories are each different members of the set including voice traffic, video traffic and data traffic.

55. The method defined in claim 51, further comprising the adjacent one of the DCIs receiving the particular packet, reading the tag associated with the particular packet to determine an identity of the destination DCI for the particular packet and comparing the identity of the destination DCI to a predetermined identifier associated with the adjacent one of the DCIs.

56. The method defined in claim 55, further comprising the adjacent one of the DCIs forwarding the particular packet to a further adjacent one of the DCIs in said cluster if the identity of the destination DCI does not match the predetermined identifier associated with the adjacent one of the DCIs.

57. The method defined in claim 42, further comprising the designated one of the DCIs determining the CPD for which the particular packet is destined and routing the particular packet to the CPD for which the particular packet is destined, if the identity of the destination DCI matches the predetermined identifier associated with the first one of the DCIs.

58. The method defined in claim 57, wherein routing the particular packet to the CPD for which the particular packet is destined comprises sending the particular packet over an output port connected by a communication link to the CPD for which the particular packet is destined.

59. The method defined in claim 58, further comprising removing the tag associated with the particular packet prior to said sending.

60. The method defined in claim 42, further comprising, for a particular one of said clusters:
    receiving upstream traffic via an access interface for a particular one of the DCIs in said particular cluster, the traffic comprising upstream packets, each of said upstream packets originating from at least one of the CPDs reachable via said particular DCI; and
    sending the upstream packets towards a head-end unit over a communication link.

61. The method defined in claim 60, further comprising, for the particular one of said DCIs, receiving additional upstream traffic from an adjacent one of the DCIs in said particular cluster, the additional upstream traffic comprising additional upstream packets, each of said additional upstream packets originating from at least one of the CPDs reachable via ones of said DCIs in said particular cluster other than the particular DCI; and aggregately sending said upstream packets and said additional upstream packets to a designated one of the DCIs in said particular cluster that is connected to the communication link and that is responsible for releasing the upstream traffic towards the head-end unit.

62. The method defined in claim 61, wherein said aggregately sending involves using a loop-back connection to the designated one of the DCIs.

63. A method of routing traffic originating from a plurality of customer premises devices (CPDs), wherein traffic originating from each of the CPDs arrives via a corresponding one of a plurality of outside plant units (OPUs), the method comprising:

receiving traffic from the OPUs via respective input interfaces, the traffic comprising packets each of which originates from a respective one of said CPDs;

determining a traffic category of each of said packets received from a particular one of the OPUs;

releasing via a first output interface dedicated to the first traffic category those packets from the particular OPU that are determined to be in a first traffic category;

releasing via a second output interface dedicated to the second traffic category those packets from the same particular OPU that are determined to be in a second traffic category;

prioritizing the release of packets via the first output interface over the release of the packets via the second interface; and determining whether prioritization is required, wherein said prioritizing is carried out as a function of whether it is determined that prioritization is required, wherein said prioritizing is carried out only if it is determined that prioritization is required.

64. The method defined in claim 63, wherein determining the traffic category of each of said packets comprises consulting a header of each of said packets, said header identifying the traffic category of each of said packets.

65. The method defined in claim 63, wherein determining the traffic category of each of said packets comprises determining a particular virtual local area network (VLAN) associated with each of said packets and consulting a mapping to determine the traffic category associated with the particular VLAN.

66. The method defined in claim 63, further comprising buffering the packets in the first traffic category prior to said releasing.

67. The method defined in claim 66, further comprising converting the packets in the first traffic category from electrical to optical format after said buffering.

68. The method defined in claim 66, wherein buffering comprising placing the packets in the first traffic category into a buffer.

69. The method defined in claim 68, wherein the buffer comprises packets originating from plural ones of the CPDs.

70. The method defined in claim 68, wherein the buffer comprises packets received from plural ones of the OPUs.

71. The method defined in claim 66, further comprising buffering the packets in the second traffic category prior to said releasing.

72. The method defined in claim 71, further comprising converting the packets in the second traffic category from electrical to optical format after said buffering.

73. The method defined in claim 71, wherein buffering comprising placing the packets in the second traffic category into a second buffer.

74. The method defined in claim 73, wherein the second buffer comprises packets originating from plural ones of the CPDs.

75. The method defined in claim 73, wherein the second buffer comprises packets received from plural ones of the OPUs.

76. The method defined in claim 63, wherein the first and second traffic categories are each different members of the set including voice traffic, video traffic and data traffic.

77. The method defined in claim 63, wherein the first output interface and the second output interface are connected to distinct physical ports and are distinguishable physically.

78. The method defined in claim 63, wherein the first output interface and the second output interface are connected to a common physical port and are distinguishable logically.

79. The method defined in claim 63, further comprising releasing via a third output interface dedicated to the third traffic category those packets determined to be in a third traffic category.

80. Apparatus for use in regulating traffic flow to a plurality of customer premises devices (CPDs), each of the CPDs being reachable via a corresponding one of a plurality of outside plant units (OPUs), said apparatus comprising:

a first interface dedicated to the first traffic category over which is received traffic in a first traffic category, the traffic in the first traffic category comprising first packets, each of said first packets being destined for a respective one of said CPDs;

a second interface dedicated to the second traffic category and over which is received traffic in a second traffic category, the traffic in the second traffic category comprising second packets, each of said second packets being destined for a respective one of said CPDs;

a plurality of OPU interfaces, the OPU interfaces being uniquely associated with respective ones of said OPUs and connectable thereto;

a plurality of output buffers, each of the output buffers being configured to temporarily store packets for release towards a respective one of said OPUs via the uniquely associated one of said OPU interfaces;

a distribution/routing engine configured to determine a destination OPU for each of the first and second packets and to send each of the first and second packets towards the output buffer associated with the destination OPU for that packet, the destination OPU for a particular packet being determined by identifying the OPU via which the CPD for which the particular packet is destined is reachable; and at least one output buffer control entity configured to regulate packet flow via the OPU interfaces by prioritizing release from at least one of said output buffers of buffered packets that are first packets destined for a particular OPU and received via the first interface dedicated to the first traffic category over release of buffered packets that are second packets destined for that same OPU and received via the second interface dedicated to the second traffic category;

wherein the at least one output buffer control entity is further configured to determine whether prioritizing is required, said prioritizing being carried out as a function of whether the at least one output buffer control entity has determined that prioritization is required; and wherein the at least one output buffer control entity is further configured to carry out said prioritizing only if it is determined that prioritization is required.

81. The apparatus defined in claim 80, further comprising:
a first input buffer and a second input buffer, the first input buffer being configured to temporarily store packets received via the first interface for release towards the distribution/routing engine, the second input buffer being configured to temporarily store packets received via the second interface for release towards the distribution/routing engine.

82. The apparatus defined in claim 80, wherein the distribution/routing engine comprises a plurality of distributor/routers, each distributor/router being dedicated to processing packets in a different one of said traffic categories.

83. The apparatus defined in claim 80, wherein the first interface comprises circuitry that allows traffic in the first traffic category to be exchanged bidirectionally with a switching entity further upstream.

84. The apparatus defined in claim 83, wherein the traffic in the first traffic category is exchanged bidirectionally over an optical link.

85. The apparatus defined in claim 83, wherein the second interface comprises circuitry that allows traffic in the second traffic category to be exchanged bidirectionally with a switching entity further upstream.

86. The apparatus defined in claim 85, wherein the traffic in the second traffic category is exchanged bidirectionally over an optical link.

87. The apparatus defined in claim 80, wherein each of the OPU interfaces comprises circuitry for allowing packets to be exchanged bidirectionally with the uniquely associated OPU.

88. The apparatus defined in claim 87, wherein the packets are exchanged bidirectionally with the uniquely associated OPU over an optical link.

89. The apparatus defined in claim 80, wherein each of the first and second packets comprises a header indicative of the respective CPD for which the packet is destined.

90. The apparatus defined in claim 89, wherein to determine the destination OPU for each of the first and second packets, the distribution/routing engine is configured to examine the header of the packet to identify the respective CPD for which the packet is destined, and to consult a mapping to determine the destination OPU based on the destination CPD.

91. The apparatus defined in claim 80, wherein the at least one output buffer control entity is further configured to monitor an occupancy level of the plurality of output buffers.

92. The apparatus defined in claim 91, wherein to determine that prioritization is required, the at least one output buffer control entity is further configured to determine whether the occupancy level of one of the output buffers has exceeded a threshold occupancy level.

93. The apparatus defined in claim 91, wherein to determine that prioritization is required, the at least one output buffer control entity is further configured to determine whether the occupancy level of one of the output buffers has continuously exceeded a threshold occupancy level for more than a threshold length of time.

94. The apparatus defined in claim 91, wherein to determine that prioritization is required, the at least one output buffer control entity is further configured to determine whether a rate of change of the occupancy level of one of the output buffers has exceeded a threshold rate of change.

95. The apparatus defined in claim 91, wherein to determine that prioritization is required, the at least one output buffer control entity is further configured to determine whether a rate of change of the occupancy level of one of the output buffers has continuously exceeded a threshold rate of change for more than a threshold length of time.

96. The apparatus defined in claim 91, wherein to send each of the first and second packets towards the output buffer associated with the destination OPU for that packet, the distribution/routing engine is further configured to send each of the packets to an input of either a first micro-buffer or a second micro-buffer based on whether the packet is one of the first packets or one of the second packets.

97. The apparatus defined in claim 96, wherein the at least one output buffer control entity is further configured to identify each of the packets as one of the first packets or one of the second packets based on whether the packet was received via the first interface or the second interface, respectively.

98. The apparatus defined in claim 91, wherein to send each of the first and second packets towards the output buffer associated with the destination OPU for that packet, the distribution/routing engine is further configured to place each of the packets into either a first memory area or a second memory area based on whether the packet is one of the first packets or one of the second packets.

99. The apparatus defined in claim 98, wherein the at least one output buffer control entity is further configured to identify each of the packets as one of the first packets or one of the second packets based on whether the packet was received via the first interface or the second interface, respectively.

100. The apparatus defined in claim 91, wherein the at least one output buffer control entity is further configured to identify each of the packets as one of the first packets or one of the second packets.

101. The apparatus defined in claim 100, wherein the at least one output buffer control entity is further configured to identify each of the packets as one of the first packets or one of the second packets based on whether the packet was received via the first interface or the second interface, respectively.

102. The apparatus defined in claim 91, wherein the plurality of output buffers comprise respective dedicated hardware memory resources.

103. The apparatus defined in claim 91, wherein the plurality of output buffers share a pooled hardware memory resource.

104. The apparatus defined in claim 80, wherein each of the OPU interfaces is connected to its uniquely associated OPU by a communication link, and wherein to determine whether prioritization is required, the at least one output buffer control entity is further configured to determine whether there is congestion on said communication link.

105. The apparatus defined in claim 80, wherein each of the OPU interfaces is connected to its uniquely associated OPU by a communication link, and wherein to determine whether prioritization is required, the at least one output buffer control entity is further configured to determine whether a current time of day falls within a time interval associated with a requirement for prioritization.

106. The apparatus defined in claim 80, wherein the first and second traffic categories are each different members of the set including voice traffic, video traffic and data traffic.

107. The apparatus defined in claim 80, wherein the first interface and the second interface are connected to distinct physical ports and are distinguishable physically.

108. The apparatus defined in claim 80, wherein the first interface and the second interface are connected to a common physical port and are distinguishable logically.

109. The apparatus defined in claim 108, wherein the first packets are received from a first network entity, wherein the second packets are received from a second network entity, and wherein each of the packets is transmitted in a format that allows detection of whether it was received from the first network entity or the second network entity.

110. The apparatus defined in claim 80, wherein to carry out said prioritizing, the at least one output buffer control entity is further configured to allow release of all buffered first packets before allowing release of any buffered second packet.

111. The apparatus defined in claim 80, wherein to carry out said prioritizing, the at least one output buffer control entity is further configured such that for each buffered second packet that is released, a greater number of buffered first packets is released.

112. The apparatus defined in claim 80, further comprising:
a third interface dedicated to the third traffic category and over which is received traffic in a third traffic category, the traffic in the third traffic category comprising third packets, each of said third packets being destined for a respective one of said CPDs;
wherein the distribution/routing engine is further configured to determine a destination OPU for each of the third packets and to send each of the third packets towards the output buffer associated with the destination OPU for that third packet, the destination OPU for a particular third packet being determined by identifying the OPU via which the CPD for which the particular third packet is destined is reachable; and
wherein the at least one output buffer control entity is configured to regulate packet flow via the OPU interfaces by prioritizing release from at least one of said output buffers of buffered packets that are first packets over release of buffered packets that are second packets or third packets.

113. The apparatus defined in claim 112, wherein the first traffic category comprises video traffic, wherein the second traffic category comprises voice traffic and wherein the third traffic category comprises data traffic.

114. The apparatus defined in claim 80, further comprising:
a plurality of input interfaces for receiving upstream traffic from the OPUs, the upstream traffic comprising upstream packets each of which originates from a respective one of said CPDs; and
an upstream distribution/routing engine configured to determine a traffic category of each of said upstream packets, to release via said first interface those upstream packets determined to be in said first traffic category and to release via said second interface those upstream packets determined to be in said second traffic category.

115. The apparatus defined in claim 114, wherein the plurality of OPU interfaces and the plurality of input interfaces are common bidirectional interfaces.

116. The apparatus defined in claim 114, wherein to determine the traffic category of each of said upstream packets, the upstream distribution/routing engine is configured to consult a header of each of said upstream packets, said header identifying the traffic category of each of said upstream packets.

117. The apparatus defined in claim 114, wherein to determine the traffic category of each of said upstream packets, the upstream distribution/routing engine is configured to determine a particular virtual local area network (VLAN) associated with each of said upstream packets and to consult a mapping to determine the traffic category associated with the particular VLAN.

118. The apparatus defined in claim 114, further comprising a first upstream output buffer configured to temporarily store the upstream packets in the first traffic category prior to said releasing.

119. The apparatus defined in claim 118, further comprising circuitry for converting the upstream packets in the first traffic category from electrical to optical format after having been temporarily stored in the first upstream output buffer.

120. The apparatus defined in claim 119, wherein the packets temporarily stored in the first upstream output buffer include packets originating from plural ones of the CPDs.

121. The apparatus defined in claim 119, wherein the packets temporarily stored in the first upstream output buffer include packets originating from plural ones of the OPUs.

122. The apparatus defined in claim 118, further comprising a second upstream output buffer configured to temporarily store the upstream packets in the second traffic category prior to said releasing.

123. The apparatus defined in claim 122, further comprising circuitry for converting the upstream packets in the second traffic category from electrical to optical format after having been temporarily stored in the second upstream output buffer.

124. The apparatus defined in claim 123, wherein the packets temporarily stored in the second upstream output buffer include packets originating from plural ones of the CPDs.

125. The apparatus defined in claim 123, wherein the packets temporarily stored in the second upstream output buffer include packets originating from plural ones of the OPUs.

126. The apparatus defined in claim 80, wherein the distribution/routing engine is further configured to tag each of the packets with an indication of the destination DCI for the packet and wherein the distribution/routing engine is further configured to route the tagged packet towards the output buffer respectively associated with the destination OPU for the packet.

127. The apparatus defined in claim 126, wherein each of the packets comprises a header indicative of the CPD for which the packet is destined.

128. The apparatus defined in claim 127, wherein to determine the destination DCI and the destination OPU for each of the packets, the distribution/routing engine is further configured to examine the header of the packet to identify the CPD for which the packet is destined, and to consult a mapping to determine the destination DCI and the destination OPU based on the CPD for which the packet is destined.

129. The apparatus defined in claim 126, wherein to tag each of the packets with an indication of the particular DCI for the packet, the distribution/routing engine is further configured to associate a tag to the packet, said tag being indicative of the particular DCI.

130. The apparatus defined in claim 126, wherein the plurality of output buffers comprise respective dedicated hardware memory resources.

131. The apparatus defined in claim 126, wherein the plurality of output buffers share a pooled hardware memory resource.

132. The apparatus defined in claim 126, wherein the packets in the buffer respectively associated with a particular OPU interface include first packets and second packets, wherein the first packets carry traffic in a first category of traffic and the second packets carry traffic in a second category of traffic, the apparatus further comprising:

an output buffer control entity configured to regulate packet flow via the OPU interface by prioritizing transmission of the first packets over transmission of the second packets.

133. The apparatus defined in claim 126, wherein the first and second categories of traffic are each different members of the set including voice traffic, video traffic and data traffic.

134. Apparatus for use in regulating traffic flow to a plurality of customer premises devices (CPDs), each of the CPDs being reachable via a corresponding one of a plurality of outside plant units (OPUs), said apparatus comprising:
   means for receiving traffic in a first traffic category via a first interface dedicated to the first traffic category, the traffic in the first traffic category comprising first packets, each of said first packets being destined for a respective CPD that is among said plurality of CPDs;
   means for receiving traffic in a second traffic category via a second interface dedicated to the second traffic category, the traffic in the second traffic category comprising second packets, each of said second packets being destined for a respective CPD that is among said plurality of CPDs;
   means for determining a destination OPU for each of the first and second packets and, for each particular OPU that is the destination OPU for one or more packets, buffering the one or more packets and transmitting the buffered packets via an OPU interface uniquely associated with the particular OPU, the destination OPU for a particular packet being determined by identifying the OPU via which the CPD for which the particular packet is destined is reachable;
   means for regulating packet flow via the OPU interface by prioritizing transmission of those of the buffered packets that are first packets destined for a particular OPU and received via the first interface dedicated to the first traffic category over transmission of those of the buffered packets that are second packets destined for that same OPU and received via the second interface dedicated to the second traffic category; and
   means for regulating being configured for determining whether prioritization is required, wherein said prioritizing is carried out as a function of whether it is determined that prioritization is required, wherein said prioritizing is carried out only if it is determined that prioritization is required.

135. Apparatus for use in routing traffic originating from a plurality of customer premises devices (CPDs), wherein traffic originating from each of the CPDs arrives via a corresponding one of a plurality of outside plant units (OPUs), said apparatus comprising:
   a plurality of input interfaces over which is received traffic from respective ones of the OPUs, the traffic comprising packets each of which originates from a respective one of said CPDs;
   a first output interface dedicated to the first traffic category and a second output interface dedicated to the second traffic category;
   a distribution/routing engine configured to determine a traffic category of each of the packets received from a particular one of the OPUs, to release via the first output interface those packets from the particular OPU that are determined to be in a first traffic category and to release via the second output interface those packets from the particular OPU that are determined to be in a second traffic category different from the first traffic category, the distribution/routing engine further configured to prioritize the release of packets via the first output interface over the release of packets via the second output interface; and
   determining whether prioritization is required, wherein said prioritizing is carried out as a function of whether it is determined that prioritization is required, wherein said prioritizing is carried out only if it is determined that prioritization is required.

136. Apparatus for use in routing traffic originating from a plurality of customer premises devices (CPDs), wherein traffic originating from each of the CPDs arrives via a corresponding one of a plurality of outside plant units (OPUs), said apparatus comprising:
   means for receiving traffic from the OPUs via respective input interfaces, the traffic comprising packets each of which originates from a respective one of said CPDs;
   means for determining a traffic category of each of said packets received from a particular one of the OPUs;
   means for releasing via a first output interface dedicated to the first traffic category those packets from the particular OPU that are determined to be in a first traffic category;
   means for releasing via a second output interface dedicated to the second traffic category those packets from the same particular OPU that are determined to be in a second traffic category;
   means for prioritizing the release of the packets via the first output interface over the release of the packets via the second interface; and
   determining whether prioritization is required, wherein said prioritizing is carried out as a function of whether it is determined that prioritization is required, wherein said prioritizing is carried out only if it is determined that prioritization is required.

* * * * *